United States Patent
Tachibana et al.

(10) Patent No.: US 8,718,930 B2
(45) Date of Patent: May 6, 2014

(54) ACOUSTIC NAVIGATION METHOD

(71) Applicant: Sony Mobile Communications, Inc., Tokyo (JP)

(72) Inventors: Makoto Tachibana, Tokyo (JP); Takashi Shiina, Tokyo (JP); Tetsuya Naruse, Tokyo (JP); Yuichi Shirai, Tokyo (JP); Chikashi Yajima, Tokyo (JP); Susumu Takatsuka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 13/968,856

(22) Filed: Aug. 16, 2013

(65) Prior Publication Data

US 2014/0058662 A1    Feb. 27, 2014

Related U.S. Application Data

(60) Provisional application No. 61/692,947, filed on Aug. 24, 2012.

(51) Int. Cl.
*H04R 5/00*    (2006.01)

(52) U.S. Cl.
USPC ............ 701/428; 367/124; 381/310; 381/26; 701/300

(58) Field of Classification Search
USPC ................ 701/300, 302, 409, 428, 445, 498; 455/456.6; 367/118, 124, 126; 381/26, 381/300–311
See application file for complete search history.

(56) References Cited

U.S. PATENT DOCUMENTS 6,614,912 B1 * 9/2003 Yamada et al. ............... 381/310
8,577,046 B2 * 11/2013 Aoyagi ........................... 381/26

FOREIGN PATENT DOCUMENTS

JP    2002-005675    1/2002

* cited by examiner

*Primary Examiner* — Richard Camby
(74) *Attorney, Agent, or Firm* — Oblon, Spivak, McClelland, Maier & Neustadt, L.L.P.

(57) ABSTRACT

An information processing apparatus that detects a current location of the information processing apparatus; obtains a direction of a destination from the detected current location as a target direction; detects a facial orientation of a user wearing a headphone unit connected to the information processing apparatus via a wired or wireless connection in relation to a reference orientation based on outputs of a geomagnetic sensor and an acceleration sensor connected to the headphone unit; obtains a relative target angle based on a difference between the target direction and the user's facial orientation; and generates sound to be output by the headphone unit based on the obtained relative target angle.

16 Claims, 34 Drawing Sheets

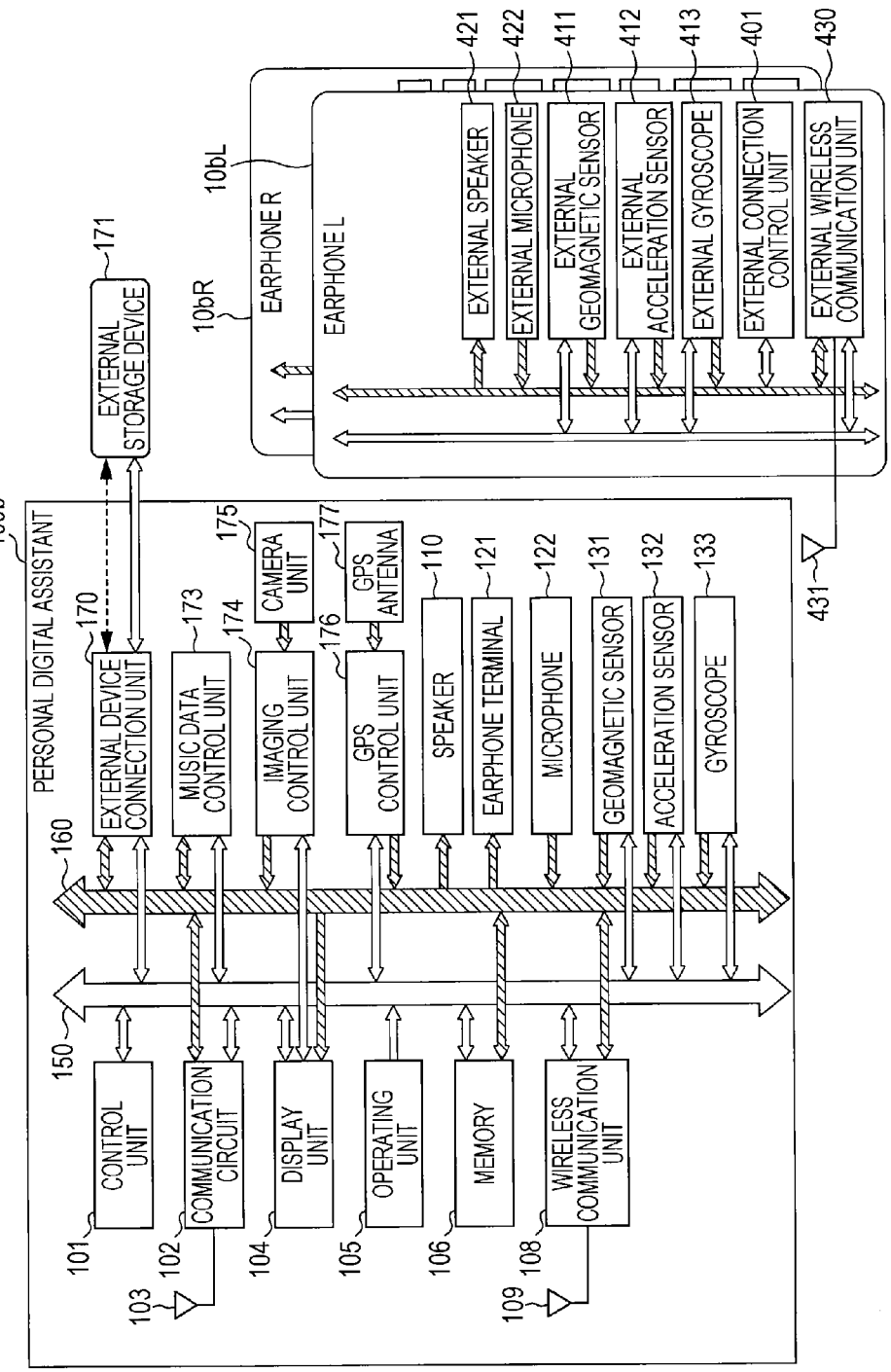

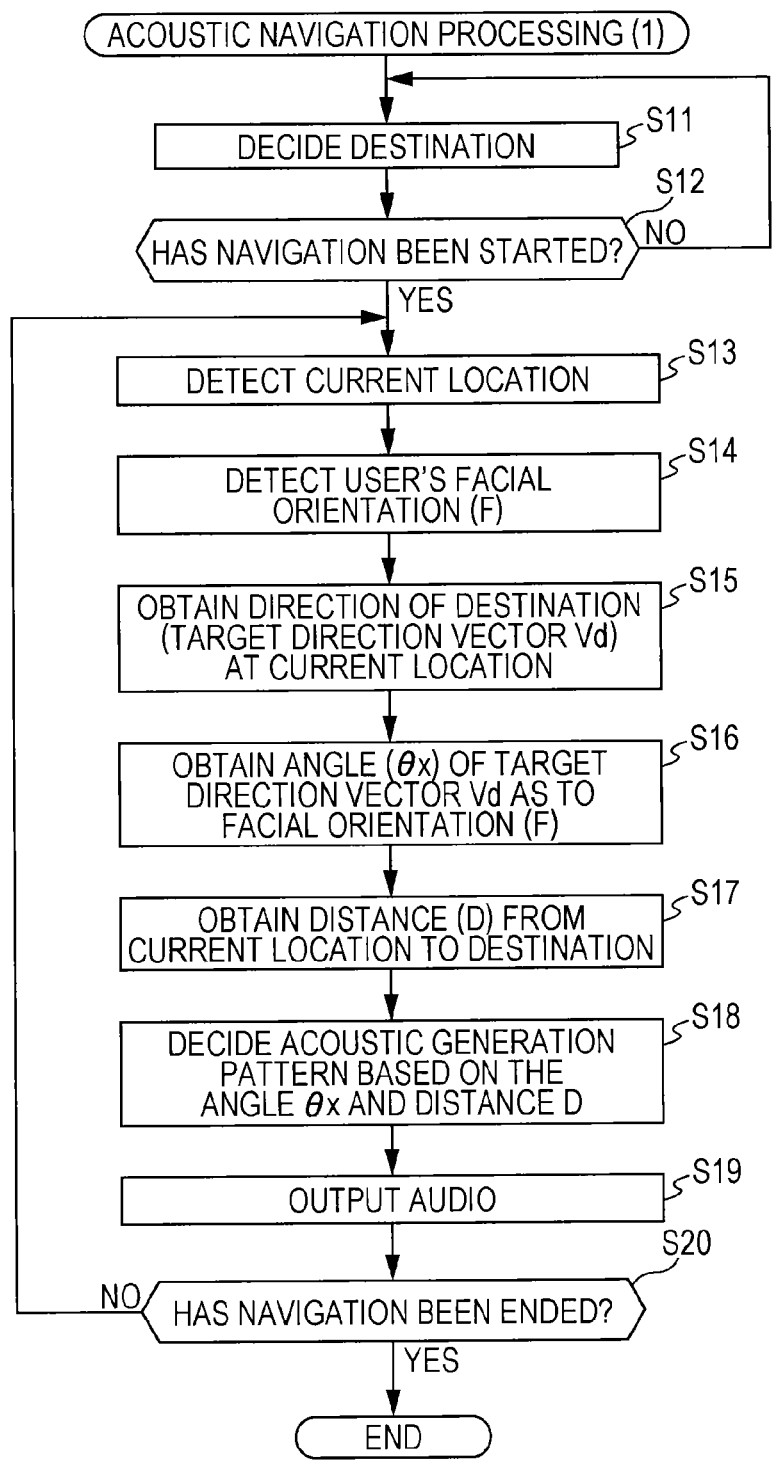

FIG. 30
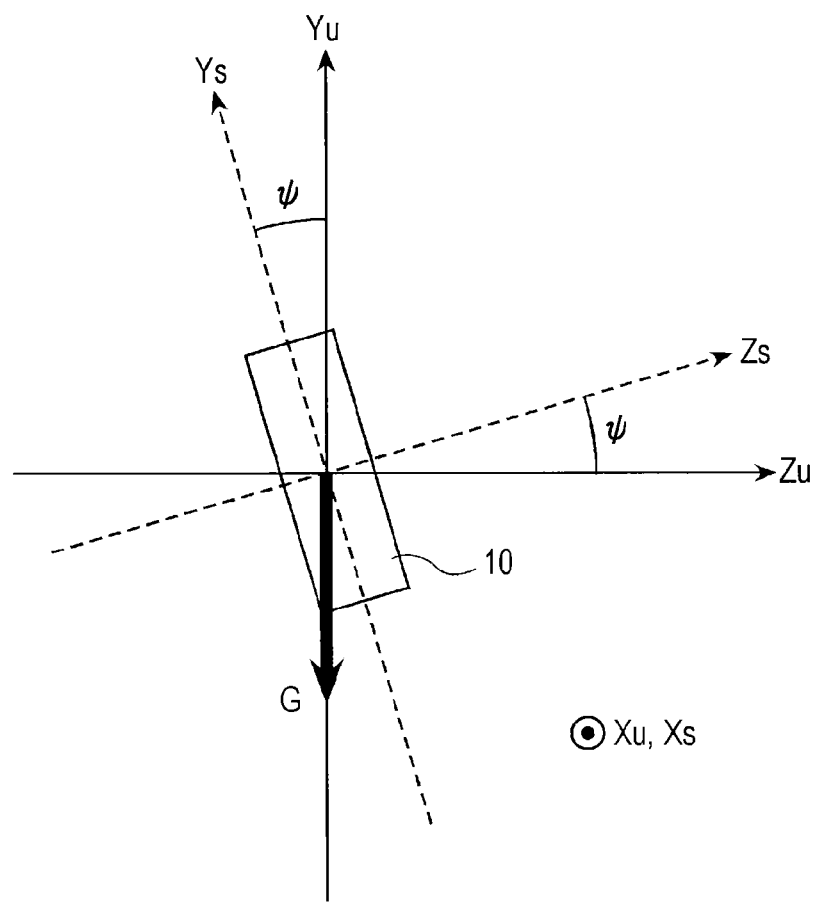
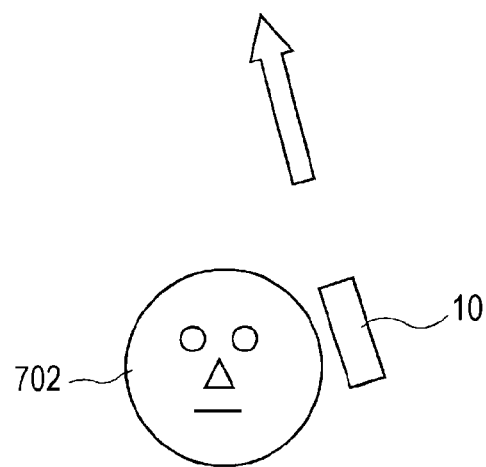

ACOUSTIC NAVIGATION METHOD

CROSS REFERENCE TO RELATED APPLICATION

The present application claims the benefit of the earlier filing date of U.S. Provisional Patent Application Ser. No. 61/692,947 filed on Aug. 24, 2012, the entire contents of which is incorporated herein by reference.

BACKGROUND

1. Field of the Disclosure

The present disclosure relates to an acoustic navigation method and apparatus using a personal digital assistant having a position detecting function, and a headphone including a geomagnetic sensor and an acceleration sensor.

2. Description of Related Art

Hitherto, with regard to pedestrian course guidance navigation by means of sound, an acoustic navigation apparatus as described in Japanese Unexamined Patent Application Publication No. 2002-5675 has been proposed. This apparatus detects a direction where a user faces (rotational direction of the head) as to a direction of travel, and with a headphone, reproduces the direction and distance perspective of a point serving as a target with sound according to a sound source existing in this point using computation by way of a transfer function.

With this technology, a head rotation angle as to a direction of travel of the user (anteroposterior direction of a user's body) is obtained as follows. Specifically, the apparatus detects the shortest distance from the user's left shoulder to the left side portion of the headphone using a well-recognized laser distance detecting method, and also detects the shortest distance from the user's right shoulder to the right side portion of the headphone. Further, the apparatus detects the rotation direction of the head (clockwise or counterclockwise as viewed from the above) using a sensor worn on around the base of the head. Based on these detected two shortest distances and the rotation direction of the head, the head rotation angle as to the user's direction of travel is obtained. Based on this head rotation angle, the position of the sound source is corrected.

Also, the user's direction of travel is obtained based on position information of two points (latitude and longitude) obtained by a position detecting unit (GPS) detecting positions where the user has moved during a short period of time.

SUMMARY

The above-mentioned conventional technology uses computation of a complicated transfer function to reproduce navigation information as sound to be heard from a place where a target actually exists. Therefore, this technology has a problem in that calculation amount becomes comparatively huge. Also, with this technology, in order to utilize this calculation, a headphone with high reproducibility of an acoustic field has to be employed. Also, even in an event that the reproducibility of the acoustic field of the headphone is high, there is individual difference in human being's hearing, and accordingly, it has been uncertain whether or not this apparatus has been able to provide easy-to-understand information as navigation.

The inventor has recognized, with such a background, necessity to perform relatively understandable acoustic navigation with relatively simple processing using a personal digital assistant having a position detecting function, and a headphone including a geomagnetic sensor and an acceleration sensor.

According to an embodiment of the present disclosure, there is provided an information processing apparatus that detects a current location of the information processing apparatus; obtains a direction of a destination from the detected current location as a target direction; detects a facial orientation of a user wearing a headphone unit connected to the information processing apparatus via a wired or wireless connection in relation to a reference orientation based on outputs of a geomagnetic sensor and an acceleration sensor connected to the headphone unit; obtains a relative target angle based on a difference between the target direction and the user's facial orientation; and generates sound to be output by the headphone unit based on the obtained relative target angle.

BRIEF DESCRIPTION OF DRAWINGS

FIG. 18 is a block diagram illustrating a configuration example of a personal digital assistant wherein the monaural-typed headphone illustrated in FIG. 12 has been changed to a stereo type headphone.

FIG. 20 is a flowchart representing a processing procedure example of first acoustic navigation processing according to an embodiment of the present disclosure.

FIG. 30 is a diagram for describing an expression representing axial conversion according to rotation around the X axis of the earphone.

DETAILED DESCRIPTION

Hereafter, embodiments of the present disclosure will be described in detail with reference to the drawings.

Headphones are apparatuses for a user basically listening to audio, music, or the like by himself/herself by converting an acoustic signal to be output from an acoustic playing apparatus into acoustic waves (audible sound). Examples of the acoustic playing apparatus include various devices such as cellular phone terminals, music players, video players, television sets, radio receivers, electronic dictionaries, game machines, and so forth. Hereafter, a portable-typed personal digital assistant with which a user can carry will be described as an acoustic playing apparatus as an example.

A headphone according to the present Specification is connected to such a personal digital assistant by cable or radio, which includes a monaural type including a single earphone, and a stereo type including a pair of earphones for right and left. An earphone is a component of the headphone to be worn so as to bring a speaker close to the ear on one side of the user.

Figure 1A:
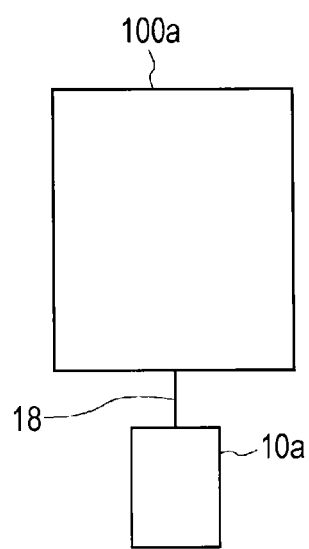
FIGS. 1A and 1B are diagrams illustrating schematic configurations of personal digital assistants including monaural-typed headphones for cable connection and for wireless connection, respectively.
Figure 1B:
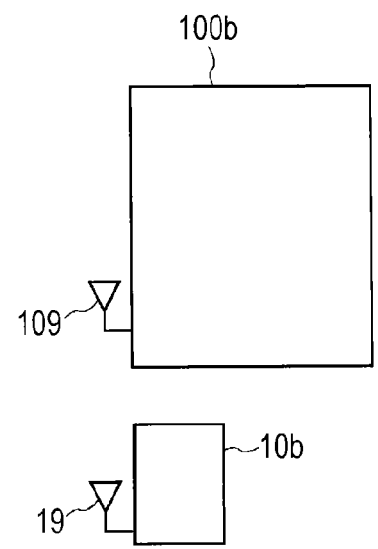
Figure 2A:
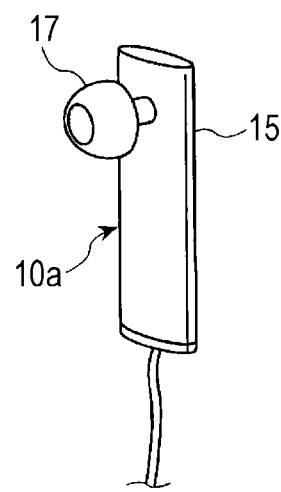
FIGS. 2A and 2B are diagrams illustrating external view examples of the monaural-typed headphones for cable connection and for wireless connection, respectively.
Figure 2B:
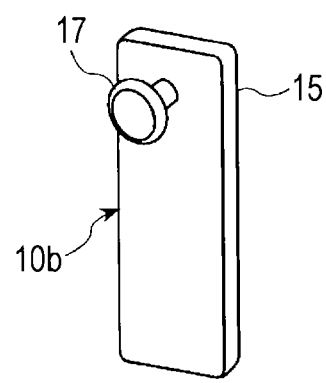

FIGS. 1A and 1B illustrate schematic configurations of personal digital assistants 100a and 100b including monaural-typed headphones for cable connection and for wireless connection, respectively. FIGS. 2A and 2B illustrate external view examples of monaural-typed headphones for cable connection and for wireless connection, respectively. The monaural-typed headphones include single earphones 10a and 10b. The earphone 10a for cable connection is connected to the corresponding personal digital assistant 100a via a cable 18. The earphone 10b for wireless connection is connected to the corresponding personal digital assistant 100b via a wireless connection interface. Both include a casing 15, and an ear hole insertion portion 17 protruding from the side face of this casing 15.

Figure 3A:
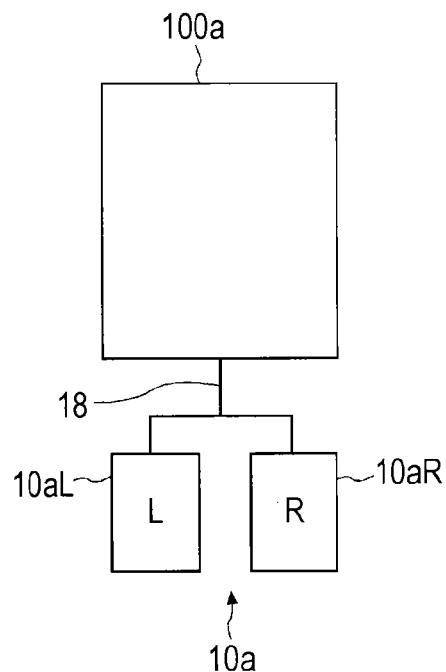
FIGS. 3A, 3B, and 3C are diagrams illustrating schematic configurations of personal digital assistants including stereo type headphones for cable connection and for wireless connection, respectively.
Figure 3B:
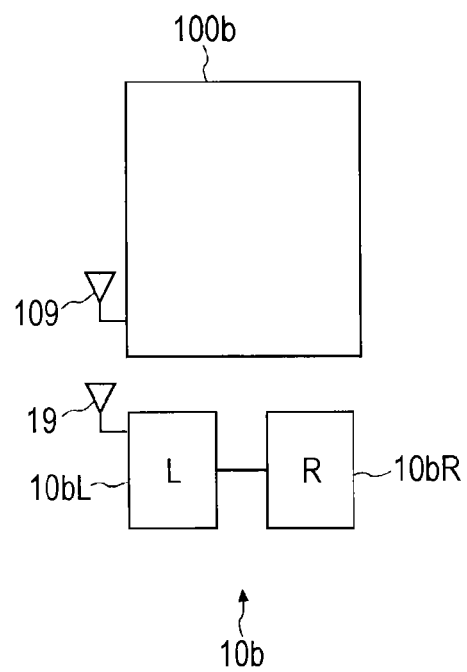
Figure 3C:
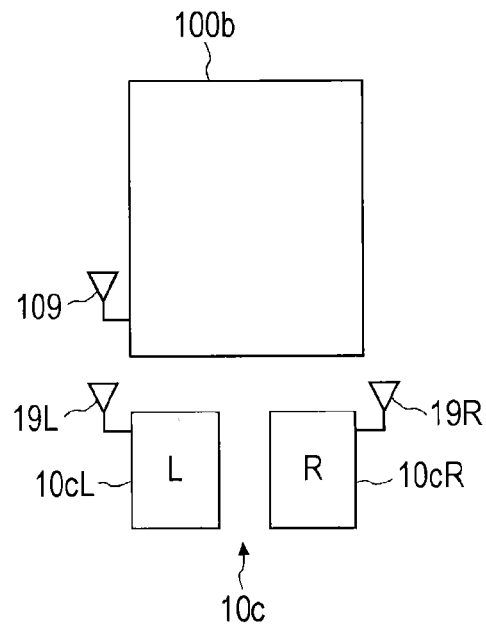

FIGS. 3A, 3B, and 3C illustrate schematic configurations of personal digital assistants 100a and 100b including stereo type headphones for cable connection and for wireless connection, respectively. Earphones 10aL and 10aR for cable connection are connected to the corresponding personal digital assistant 100a via the cable 18. The left and right earphones 10bL and 10bR are wirelessly connected to the personal digital assistant 100b via an antenna 19 thereof, and an antenna 109 of the corresponding personal digital assistant 100b. The earphones 10bL and 10bR may share the single antenna 19 as illustrated in FIG. 3B in the event that the earphones 10bL and 10bR are connected by a band or the like as illustrated in later-described FIGS. 4A and 4B. As illustrated in FIG. 3C, in the event that the left and right earphones 10cL and 10cR are mutually separated (independent), antennas 19L and 19R (and communication circuits) are separately included in both earphones. With the present embodiment, with a stereo type headphone, a later-described posture detecting unit (sensor) basically has to be provided to one of the earphones alone.

FIGS. 4A, 4B, 4C, and 4D illustrate external view examples of stereo type headphones in various modes.

Figure 4A:
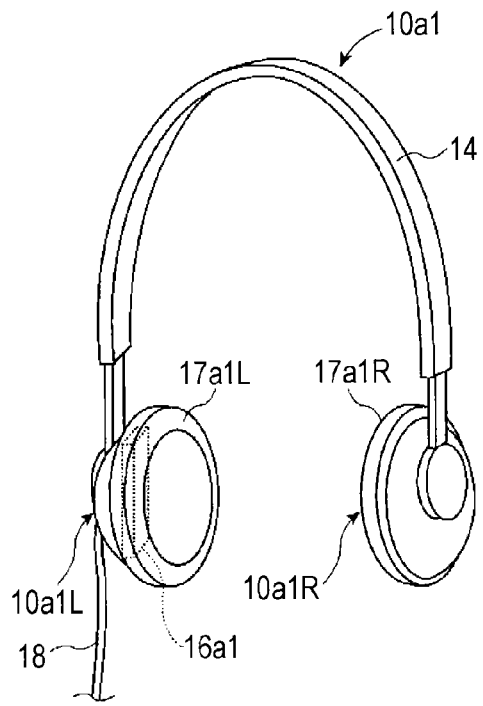
FIGS. 4A, 4B, 4C, and 4D are diagrams illustrating external view examples of stereo type headphones in various modes.

A headphone 10a1 for cable connection illustrated in FIG. 4A is connected to left and right earphones 10a1L and 10a1R by a headband 14. With one of the earphones (here, the left earphone 10a1L), a sensor device 16a1 is mounted on an ear pad 17a1L thereof, and the cable 18 for cable connection is externally pulled out. The sensor device 16a1 houses at least later-described geomagnetic sensor 11 and acceleration sensor 12. A wire (not illustrated) to communicate a signal with the other earphone (right earphone 10a1R) is internally passed through the headband 14.

Figure 4B:
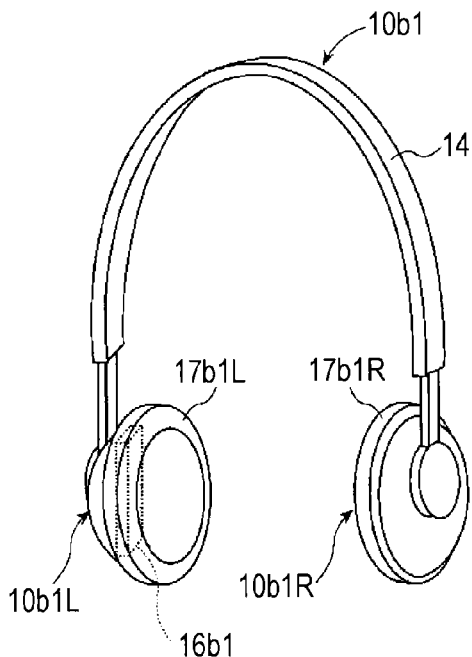

A headphone 10b1 for wireless connection illustrated in FIG. 4B is connected to left and right earphones 10b1L and 10b1R with the headband 14. With the left earphones 10b1L, in the same way as with the headphone 10a1, a sensor device 16b1 is mounted on an ear pad 17b1L thereof. A different point from the headphone 10a1 is in that the sensor device 16b1 includes a wireless communication unit (will be described later) in addition to the geomagnetic sensor 11 and acceleration sensor 12.

Figure 4C:
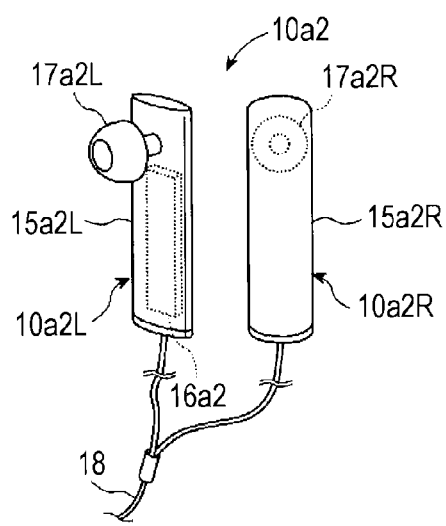
Figure 4D:
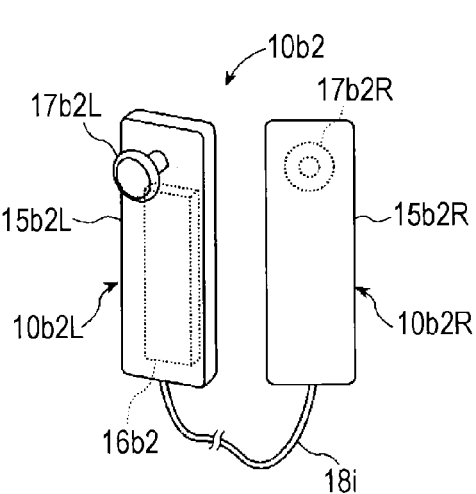

FIGS. 4C and 4D illustrate headphones (ear receivers) 10a2 and 10b2 each having ear hole insertion portions 17a2L, 17a2R, 17b2L, and 17b2R to be worn in an ear hole of the user without employing the headband, such as those called "inner ear type" or "canal type".

The headphone 10a2 for cable connection illustrated in FIG. 4C includes casings 15a2L and 15a2R, ear hole insertion portions 17a2L and 17a2R protruding on the side face thereof, and left and right earphones 10a2L and 10a2R having the cable 18 derived from the casing bottoms thereof. At least, a sensor device 16a2 is housed in the casing 15a2L of the left earphone 10a2L. The sensor device 16a2 includes at least the geomagnetic sensor 11 and acceleration sensor 12.

The headphone 10b2 for wireless connection illustrated in FIG. 4D includes casings 15b2L and 15b2R, ear hole insertion portions 17b2L and 17b2R protruding on the side face thereof, and left and right earphones 10b2L and 10b2R having a cable 18i which connects the casings thereof. At least, a sensor device 16b2 is housed in the casing 15b2L of the left earphone 10b2L. The sensor device 16b2 includes at least the geomagnetic sensor 11, acceleration sensor 12, and a wireless communication unit (will be described later). In the event that a wireless communication unit is independently included in both of the earphones 10b2L and 10b2R, the cable 18i may be omitted (corresponding to FIG. 3C).

In addition, though not illustrated in the drawing, the present embodiment may be applied to a neckband type headphone having a band to be worn around the neck, or a behind-the-ear type headphone including a behind-the-ear portion instead of the band, as modifications of the headband type.

Hereafter, though the present embodiment will be described with the headphones of the types illustrated in FIGS. 2A, 2B, 4C, and 4D as an example, the same description may be applied to other types of headphones.

Figure 5A:
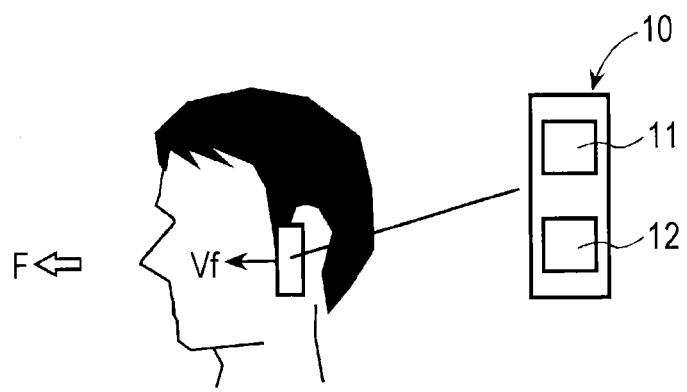
FIGS. 5A and 5B are diagrams illustrating states in which a user wears a headphone according to the present embodiment.
Figure 5B:
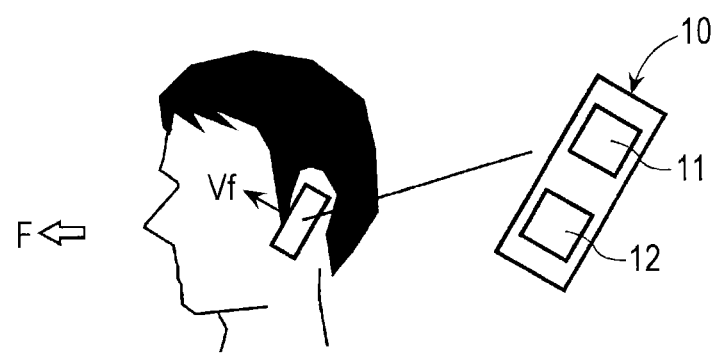

FIGS. 5A and 5B illustrate a state in which the user wears the headphone according to the present embodiment. This example is equivalent to a state in which a single earphone is worn in the left ear in the case of the monaural type, and is equivalent to a state in which a pair of earphones are worn on both ears in the case of the stereotype. Hereafter, in the event that the left and right earphones 10L and 10R do not particularly have to be distinguished, these will simply be referred to as earphone 10.

The earphone 10 may be rotated in a certain angle range with a generally straight line connecting both ears as an axis even in a state worn on the user's head. FIGS. 5A and 5B illustrate a state in which the earphone 10 is worn on the user's head with a different rotation angle. As illustrated in the drawing, the user's facial orientation F may coincide with the forward direction (forward vector Vf) unique to the earphone 10, or may not.

With the earphone 10 worn on the user's head as illustrated in FIGS. 5A and 5B, a direction where the user's face faces (facial orientation F) may be determined as follows. Specifically, as illustrated in FIG. 5A, in the event that the user has worn the earphone 10 so as to match the longitudinal direction to a direction generally vertical to the ground (vertical direction), the forward vector Vf of the earphone 10 generally coincides with the facial orientation F. On the other hand, even in the event that inclination has occurred on the earphone 10 according to how to wear the headphones 10 on the head as illustrated in FIG. 5B, the actual orientation of the user's face F is obtained by correcting the forward vector Vf of the earphone 10 using the acceleration sensor 12. Here, though rotation of the earphone with a direction connecting the user's both ears as an axis is taken as a problem, there may be rotation of the earphone with the vertical direction within the horizontal plane as an axis. In particular, the latter rotation affects on detection of orientation of the user's face.

The earphone 10 according to the present embodiment (at least one of both earphones in the case of stereo) includes a posture detecting unit configured to detect the current user's head state, and specifically, the user's facial orientation F, i.e., a direction (orientation) where the front (face portion) of the head faces. It is sufficient to mount this posture detecting unit on at least one of the earphones. With the present embodiment, description will be made with a case where this posture detecting unit is mounted on the earphone for the left ear, as an example.

The posture detecting unit according to the present embodiment includes, as described above, at least the triaxial geomagnetic sensor 11 and triaxial acceleration sensor 12 disposed near the ear at the time of wearing. In the case of wireless connection, a wireless communication unit is further provided to that end.

Figure 6:
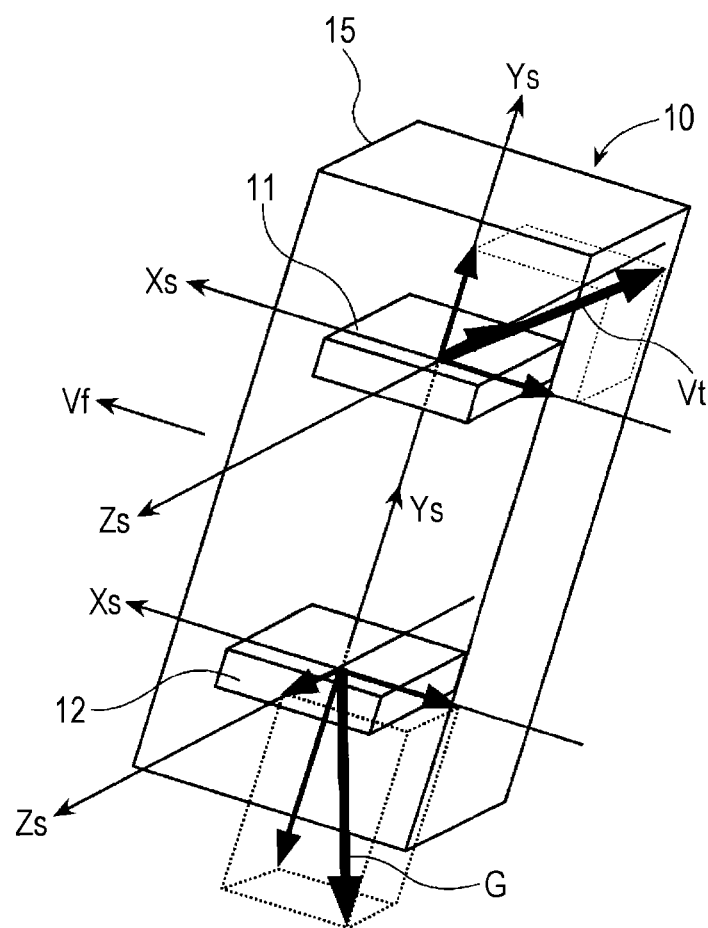
FIG. 6 is a diagram for describing working of each of the geomagnetic sensor and acceleration sensor housed in (the casings of) the earphones.

FIG. 6 is a diagram for describing working of each of the geomagnetic sensor 11 and acceleration sensor 12 housed in (the casing 15 of) the earphone 10.

According to the triaxial geomagnetic sensor 11, a geomagnetic direction in the current attitude of (the casing 15 of) the housed earphone 10, i.e., a geomagnetic vector Vt is found.

Here, for convenience of description, let us say that three axes mutually orthogonal in a local three-dimensional coordinate system (sensor coordinate system) unique to the earphone 10 (i.e., unique to the sensor) are taken as Xs axis, Ys axis, and Zs axis. The Xs axis is equivalent to an anteroposterior direction of the earphone 10, and the Ys axis is equivalent to the up-and-down direction of the earphone 10, and the Zs axis is an axis orthogonal to the Xs and Ys axes. The Zs axis is generally equivalent to a direction along a straight line connecting the user's both ears at the time of the user wearing the earphone 10. In the case that the earphone 10 is the earphone 10L to be worn on the user's left ear, a contact portion (ear hole insertion portion) for the ear is disposed on the side face of the negative direction of the Zs axis of the casing 15. Conversely, in the case of the earphone 10R to be worn on the user's right ear, the contact portion for the ear is disposed on the side face of the positive direction of the Zs axis of the casing 15. The Xs axis is orthogonal to both of the Ys and Zs axes. With this example, let us say that the positive direction of the Xs axis coincides with the forward vector Vf of the earphone 10. The geomagnetic vector Vt may generally be decomposed to components of the axes of Xs, Ys, and Zs as illustrated in the drawing.

According to the triaxial acceleration sensor 12, with a static state, the direction of the gravity in the current attitude of (the casing 15 of) the earphone 10 in which this sensor is housed, i.e., a gravity vector G is found. The gravity vector G coincides with a vertically downward direction. The gravity vector G may also be decomposed to components of the axes of Xs, Ys, and Zs as illustrated in the drawing.

The triaxial acceleration sensor 12 is employed in this way, whereby the attitude (inclination) of the earphone 10 within three-dimensional space where (the casing 15 of) the earphone 10 is disposed can be detected. Also, the triaxial geomagnetic sensor 11 is employed, whereby a bearing where the front face of (the casing 15 of) the earphone 10 faces can be detected.

Figure 7A:
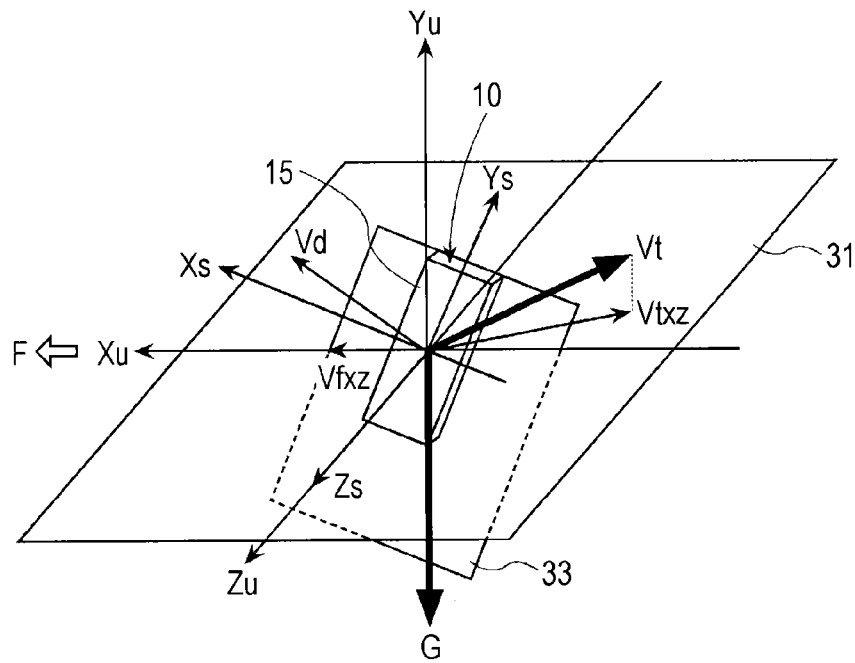
FIGS. 7A and 7B are diagrams for describing various vector relations and various angles in a three-dimensional spatial coordinate system where the headphone is disposed.
Figure 7B:
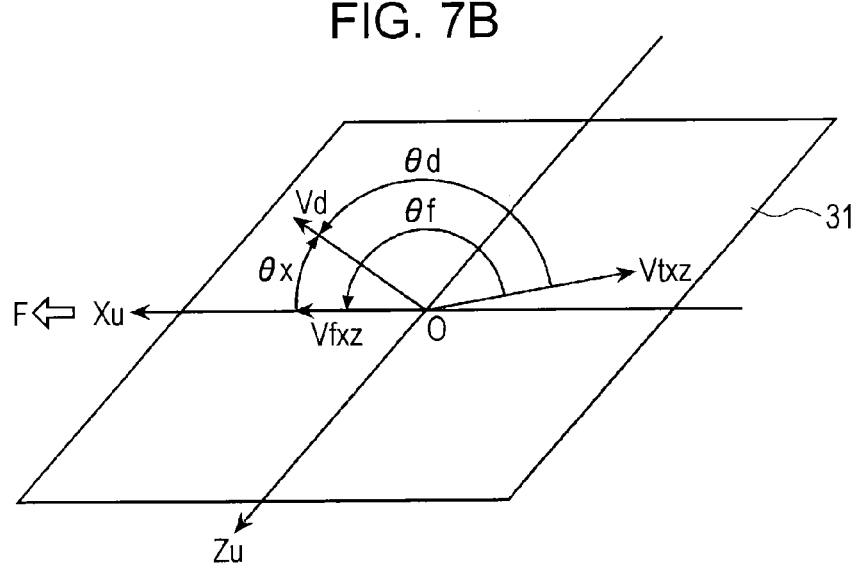

FIGS. 7A and 7B are diagrams for describing various vector relations and various angles in a three-dimensional space coordinate system where the earphone is disposed.

As illustrated in FIG. 7A, let us say that axes orthogonal to each other in the three-dimensional space where the earphone 10 is disposed, i.e., the three-dimensional space coordinate system where the user is positioned are taken as Xu axis, Yu axis, and Zu axis. This coordinate system will be referred to as user coordinate system (Xu, Yu, Zu) in distinction from the sensor coordinate system (Xs, Ys, Zs) as described above. Variables to be used for both coordinate systems will be distinguished by subscripts s (sensor) and u (user). The Xu axis is equivalent to an anteroposterior direction of the user, the Yu axis is equivalent to the up-and-down direction of the user, and the Zu axis is an axis orthogonal to the Xu and Yu axes. The Yu axial negative direction is along the gravity vector G. A plane orthogonal to the gravity vector G is an Xu-Zu plane, and is equivalent to a horizontal plane 31 within space where the user is positioned. For convenience, let us say that the Zu axis coincides with the Zs axis.

As described above, when the user wears the earphone 10, the up-and-down direction (longitudinal direction) of the earphone 10 does not necessarily coincide with the vertical direction. With the example in FIG. 7A as well, an example is illustrated wherein the vertical direction (direction along the Yu axis) does not coincide with the Ys axial direction of the sensor coordinate system.

As illustrated in FIG. 7A, for convenience, a plane 33 including the side face of the casing 15 of the earphone 10 (face that is in contact with the user's ear) is assumed, the direction of a straight line that this plane 33 intersects with the horizontal plane 31 (vector Vfxz) may be determined to be the user's facial orientation F. The facial orientation F thus obtained may include some level of error as to the accurate facial orientation according to a wearing level of the earphone. However, with a number of applications, this error can be conceived as an allowable range. As a method to obtain the facial orientation F in a more accurate manner, an arrangement may be made wherein in the event that the user has worn the headphone, the user is requested to nod the user's head in the frontal direction, and based on output of the acceleration sensor between the state before nodding the head and the maximum nodding angle state, error between the forward direction of the headphone and the user's facial orientation is obtained. In this case, the user's facial orientation is corrected with the above-mentioned error, whereby the user's facial orientation can be detected with higher precision. This specific method will be described later.

Figure 8A:
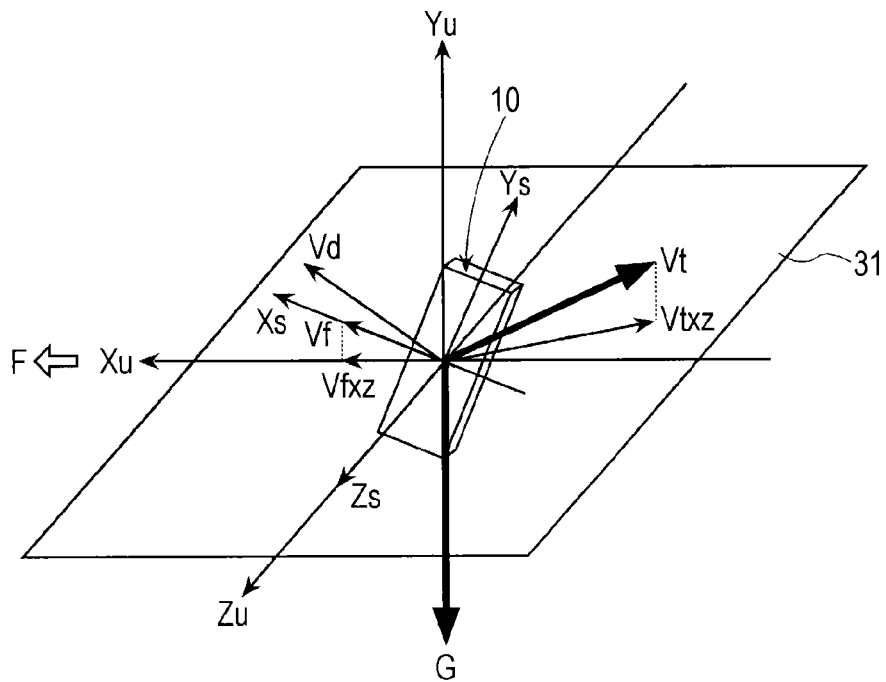
FIGS. 8A and 8B are other diagrams for describing various vector relations and various angles in a three-dimensional spatial coordinate system where the headphone is disposed.
Figure 8B:
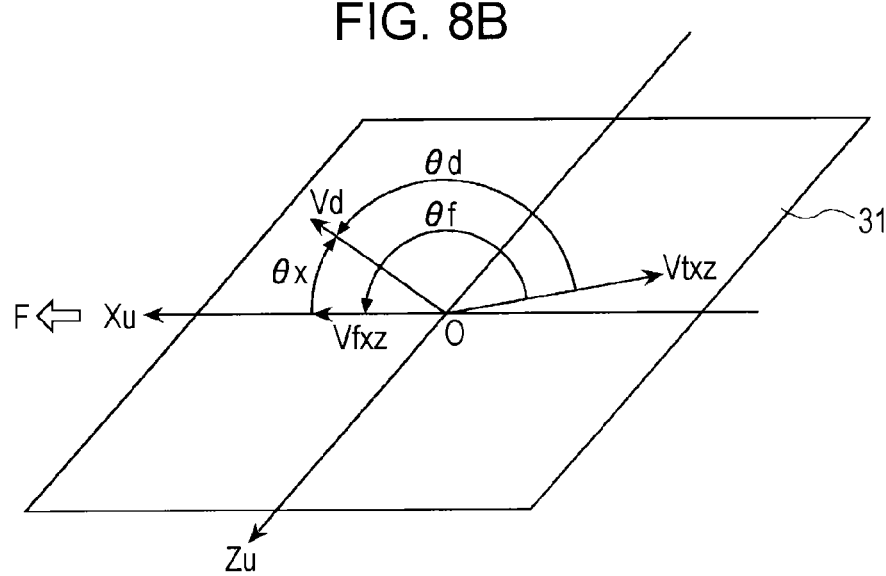

FIGS. 8A and 8B are another pair of diagrams for describing various vector relations and various angles in the three-dimensional space coordinate system where the earphone is disposed.

Instead of the obtaining method of the facial orientation F described in FIG. 7A, as illustrated in FIG. 8A, the forward vector Vf may be set along the X axial direction in an approximate manner. With this example, the forward vector Vf coincides with the positive direction of the X axis. The size of the vector Vf is optional (or in increments of vectors). A direction to specify a vector Vfxz to be obtained by projecting the forward vector Vf on the horizontal plane, i.e., on an Xu-Zu plane 31 may be determined to be the user's facial orientation F. The facial orientation F obtained by the forward vector Vf does not necessarily coincide with the facial orientation F described in FIG. 7A, and may also include error as to the accurate facial orientation. However, the facial orientation F may be obtained in a rapid and convenient manner.

In either case, upon the user moving the head, the earphone 10 worn on the head also moves together. In response to such movement of the head, the current vertical direction (gravity vector G) as to the earphone 10 is detected at individual time points. Also, the plane 33 (or forward vector Vf) in the user coordinate system is changed according to the movement of the head, and a new vector Vfxz (or facial orientation F) corresponding to this is determined.

With acoustic navigation according to the present embodiment, as illustrated in FIGS. 7B and 8B, there is obtained the angle θx (relative target angle) of the target direction (vector Vd) as to the current user's facial orientation F on the horizontal plane 31 equivalent to the Xu-Zu plane. In other words, there is obtained the relative target angle θx made up of the facial orientation F on the horizontal plane 31 (i.e., vector Vfxz) and the target direction vector Vd on the horizontal plane 31. Based on this relative target angle θx, acoustic navigation according to a combination of the above-mentioned different sound modes (acoustic pattern) is performed. The target direction vector Vd is determined on the horizontal plane 31 based on the direction of the target (e.g., destination) obtained from a map database or the like with the current location detected by a position detector employing a GPS function and so forth as the starting point.

A reference orientation vector Vtxz is obtained by the geomagnetic vector Vt being projected on the horizontal plane 31. The vector Vfxz on the horizontal plane 31 is determined as an orientation vector of an angle θf with the reference orientation vector Vtxz as a reference. The target direction vector Vd is determined as a direction vector of an angle θf with the reference orientation vector Vtxz as a reference.

The geomagnetic sensor 11 and acceleration sensor 12 are employed as a combination, whereby information of a direction (bearing) where the user (user's face) faces, to be used for navigation can be obtained even in a state in which the user is stationary, i.e., without the user's movement. Also, according to the current device technology, sensors with a relatively small size can be used as these sensors, and accordingly, these sensors can be mounted on the earphones without hindrance.

Figure 9A:
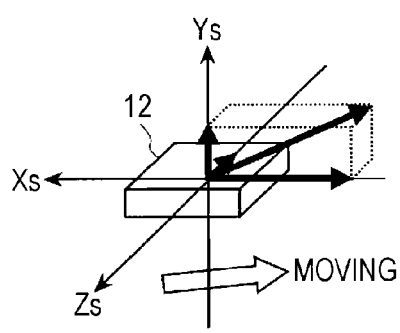
FIGS. 9A and 9B are diagrams for describing working of the acceleration sensor other than to detect a gravity vector.
Figure 9B:
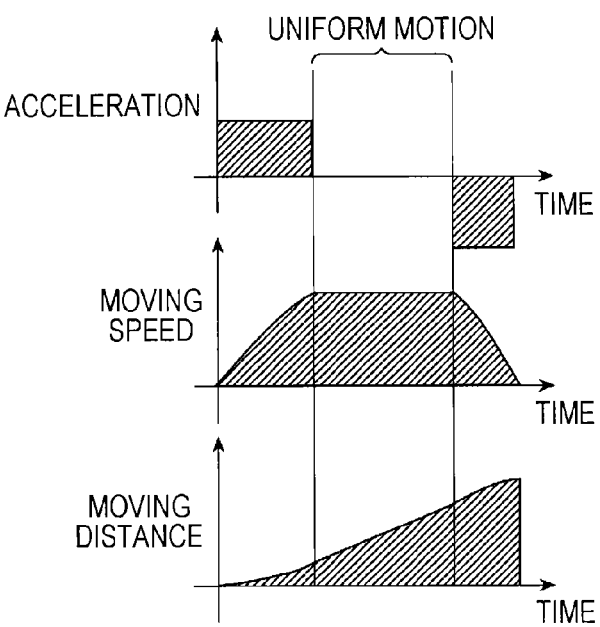

FIGS. 9A and 9B are diagrams for describing the working of the acceleration sensor 12 except that a gravity vector is detected.

As illustrated in FIG. 9A, the acceleration sensor 12 can detect motion acceleration accompanied with movement in addition to static acceleration such as the gravity or the like. For example, in the event that an object moves, positive acceleration is applied to the object thereof from a static state, and negative acceleration is applied thereto when the object stops. Therefore, as illustrated in FIG. 9B, the acceleration of the object is detected, and according to an integration value thereof, movement speed and movement distance can be obtained. However, in the event of uniform motion, acceleration is not changed, and accordingly, a moving state is failed to be detected unless acceleration is detected from a static state. Also, according to the architecture of the acceleration sensor 12, rotation is failed to be detected in the event of the earphone rotating with the gravity vector as an axis.

On the contrary, an example employing a gyroscope 13 together as a sensor will be described with reference to FIGS. 10A, 10B, and 10C.

Figure 10A:
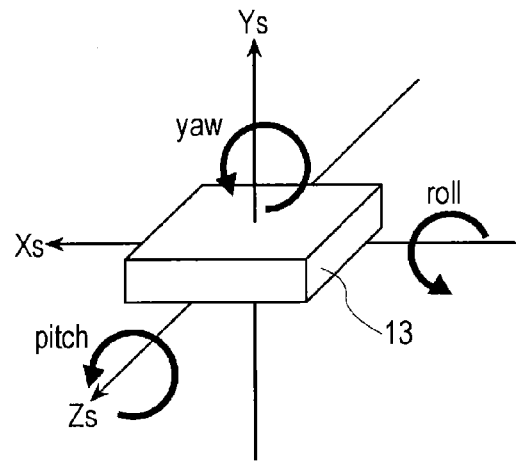
FIGS. 10A, 10B, and 10C are diagrams for describing an example of employing a gyroscope together as a sensor.
Figure 10B:
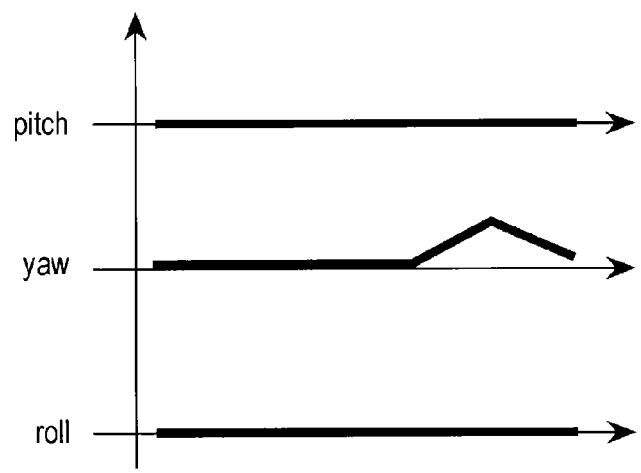
Figure 10C:
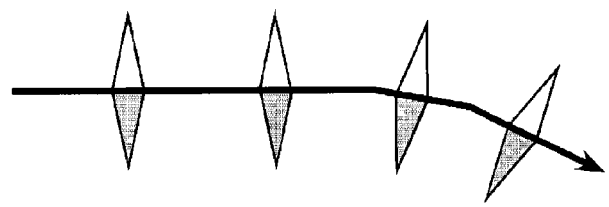

As illustrated in FIG. 10A, the gyroscope 13 is a sensor configured to detect angular velocity around each axis (roll, pitch, and yaw) of three axes of Xs, Zs, and Ys, and can detect rotation of an object. Also, the geomagnetic sensor 11 can detect a bearing where an object faces, based on a geomagnetic vector as described above. However, in the event that magnetic field lines do not face in a fixed orientation, such as the vicinity of a magnetized steel frame, when the earphone rotates while moving, an accurate bearing may be failed to be confirmed. Therefore, in the event of movement as illustrated in FIG. 10C, a rotation state can be detected only by the gyroscope. Here, the object is illustrated with a compass needle for convenience.

Accordingly, in addition to the above-mentioned geomagnetic sensor 11 and acceleration sensor 12, output of both sensors may be reinforced by employing the gyroscope 13 together as a sensor to be mounted on the earphone 10.

In this way, though the user's facial orientation F can be detected in real time with a certain level of accuracy only by the geomagnetic sensor and acceleration sensor, the earphone 10 can readily follow the user's relatively fast change in direction by employing the gyroscope (gyro sensor) together.

Figure 11:
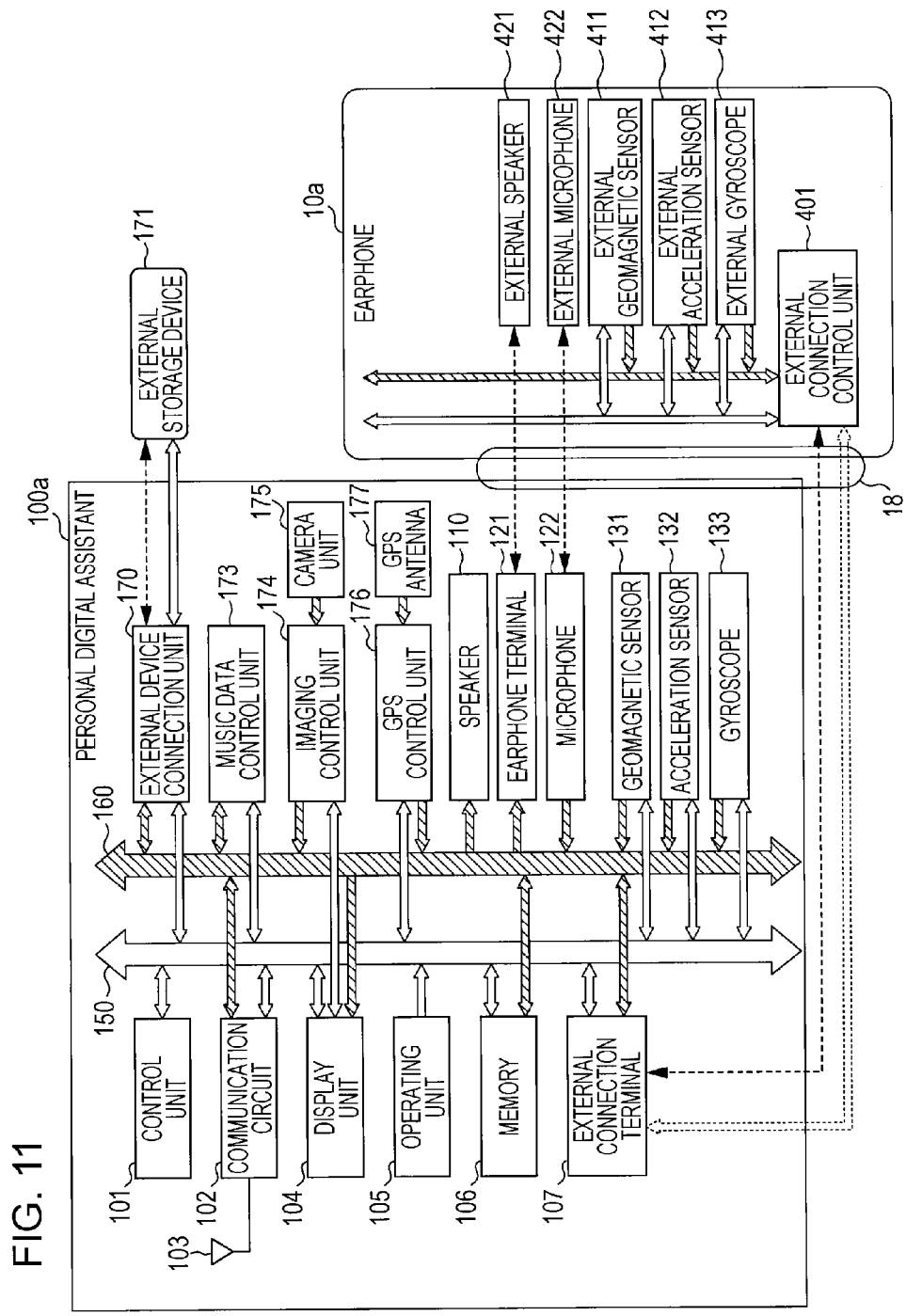
FIG. 11 is a block diagram illustrating a configuration example of a personal digital assistant according to an embodiment of the present disclosure.

FIG. 11 is a block diagram illustrating a configuration example of the personal digital assistant 100a according to the present embodiment. This personal digital assistant 100a includes a monaural-typed earphone 10a for cable connection. In general, a headphone including an earphone with a microphone is also referred to as a headset. Though no microphone is particularly illustrated in the above-mentioned block diagrams and external views of various earphones, a microphone may be housed therein. Though a microphone may be housed in the ear pads 17a1 and 17b1, casing 15, or the like, the microphone may be disposed protruding from these, or may be disposed in the middle of the cable 18.

The personal digital assistant 100a includes a control line 150 and a data line 160, and is configured of various function units such as the following, to be connected to these lines.

A control unit 101 is configured of a processing unit made up of a CPU (Central Processing Unit) or the like, and performs execution of various control programs or application programs and various data processes accompanied therewith. With the data processes, communication control, audio processing control, image processing control, other various types of signal processing, control of the units, and so forth are performed, for example.

A communication circuit 102 is a circuit for wireless communication at the time of this personal digital assistant 100a communicating with a wireless base station of a cellular phone network, for example. An antenna 103 is a wireless communication antenna at the time of this personal digital assistant performing wireless communication with a wireless base station.

A display unit 104 is a unit to supervise a display interface of this personal digital assistant, and is configured of a display device, such as a liquid crystal display unit (LCD: Liquid Crystal Display), an organic EL display unit (OEL: Organic Electro Luminescence), or the like. The display unit 104 may further include a light-emitting unit such an LED (light-emitting diode) or the like.

An operating unit 105 is a unit to supervise an input interface for user, and includes multiple operating keys and/or a touch panel.

Memory 106 is an internal storage device configured of RAM, flash memory, or the like, for example. The flash memory is nonvolatile memory, and is used for storing an OS (Operating System) program, a control program for the control unit 101 controlling each of the units, various application programs, in addition to music/moving image/still image data contents subjected to compression encoding, various setting values, font data, various types of dictionary data, model name information, terminal identification information, and so forth, for example. Also, there may be stored a phone book where the phone number, e-mail address, address, full name, face picture, portrait, and so forth of a user have been registered, transmitted/received e-mails, a schedule book where a schedule of the user of this personal digital assistant have been registered, and so forth. The RAM stores data as a work area at the time of the control unit 101 performing various types of data processing or computation whenever occasion arises.

An external connection terminal 107 is a connector to which the cable 18 connected to an earphone 10a is connected.

An external device connection unit 170 is a unit to control reading/writing of an external storage device 171 detachable for the personal digital assistant 100a. The external storage device 171 is an external memory card such as a so-called SD (Secure Digital) card or the like, for example. In this case, the external device connection unit 170 includes a slot which an external memory card is inserted/detached into/from, and performs control of writing/readout of data for the inserted external memory card, or the like, and signal processing.

A music data control unit 173 is a unit to perform readout and playback processing of music data stored in the external storage device 171 or memory 106. The music data control unit 173 may be configured to perform writing processing of music data. Played music data can be listened to by being converted into sound at the earphone 10a.

An imaging control unit 174 performs imaging control of a housed camera unit 175.

A GPS control unit 176 serves as a position detector configured to receive a signal from a predetermined satellite using a GPS antenna 177 to obtain position information (at least latitude longitude information) of the current location.

A speaker 110 is an electro-acoustic transducer for receiver audio output configured to transduce an electric signal into sound. A microphone unit (microphone) 122 is a device for transmitter audio output configured to convert sound into an electric signal.

In the event that the earphone 10a is connected to the personal digital assistant 100a, an external speaker 421 and an external microphone 422 within the earphone 10a are used instead of the speaker 110 and microphone 122 housed in the terminal. The external speaker 421 of the earphone 10a is connected to an earphone terminal 121 via the cable 18.

With the personal digital assistant 100a as well, a geomagnetic sensor 131, an acceleration sensor 132, and a gyroscope 133 are housed. These sensors are to detect the attitude, moving speed, and so forth of the personal digital assistant 100a, and are not directly used in the present embodiment.

The earphone 10a includes the external speaker 421, external microphone 422, an external geomagnetic sensor 411, an external acceleration sensor 412, and an external gyroscope 413, and an external connection control unit 401. However, with the present embodiment, the external microphone 422 and external gyroscope 413 are not vital components.

The external connection control unit 401 is connected to the sensors using the control line and data line, and also connected to the external connection terminal 107 of the personal digital assistant 100a via the cable 18. Preferably, in response to a request from the personal digital assistant 100a, the external connection control unit 401 obtains output of each sensor in a periodical manner or as appropriate, and transmits this to the personal digital assistant 100a as a sensor detection signal. More specifically, the external connection control unit 401 includes a connector conforming to so-called USB 2.0 (Universal Serial Bus 2.0) as various types of external connector, for example. Therefore, the personal digital assistant also includes a USB 2.0 controller.

Note that the personal digital assistant 100a may include various types of components included in an existing personal digital assistant not illustrated in FIG. 11.

Figure 12:
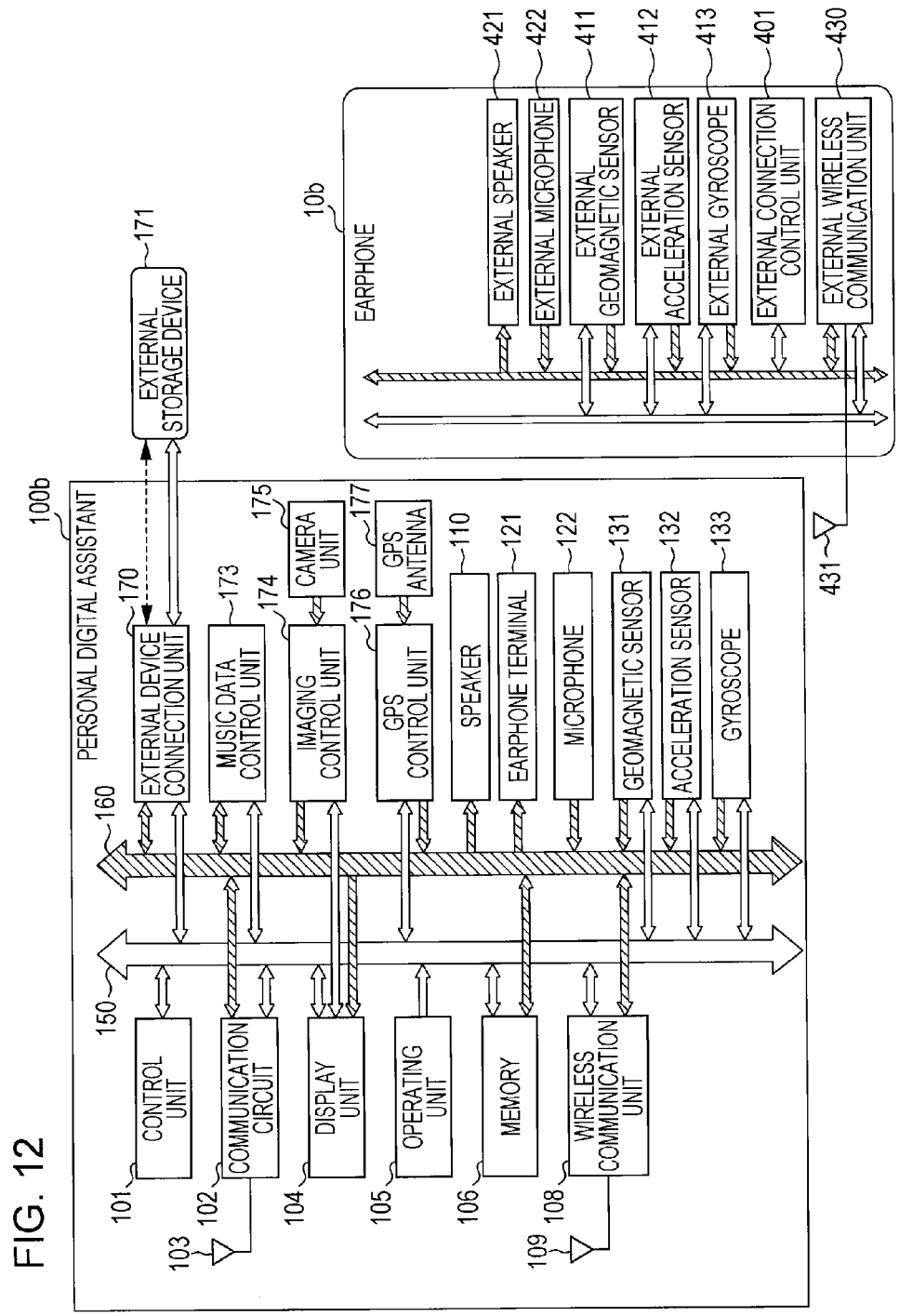
FIG. 12 is a diagram illustrating a configuration example of a personal digital assistant employing wireless connection type earphones, according to an embodiment of the present disclosure.

FIG. 12 illustrates a configuration example of a personal digital assistant 100b employing a wireless connection type earphone 10b. Basically, the personal digital assistant 100b has the same configuration as the configuration of the personal digital assistant 100a illustrated in FIG. 11, and similar components are denoted with the same reference numerals, redundant description will be omitted, and different points alone will be described.

A headphone 10b includes an external wireless communication unit 430 and an external communication antenna 431, and performs wireless communication with an antenna 109 of a wireless communication unit 108 of the personal digital assistant 100b. This wireless communication is short-distance wireless communication, and wireless communication with relatively short-distance is performed using a short-distance wireless communication method, for example, such as Bluetooth (Bluetooth: registered trademark) or the like.

Next, description will be made regarding a specific example of an acoustic navigation apparatus to be realized with the personal digital assistant 100 (generic name of 100a and 100b) and a monaural-typed earphone 10 (generic name of 10a and 10b) which have a configuration as described above.

Figure 13:
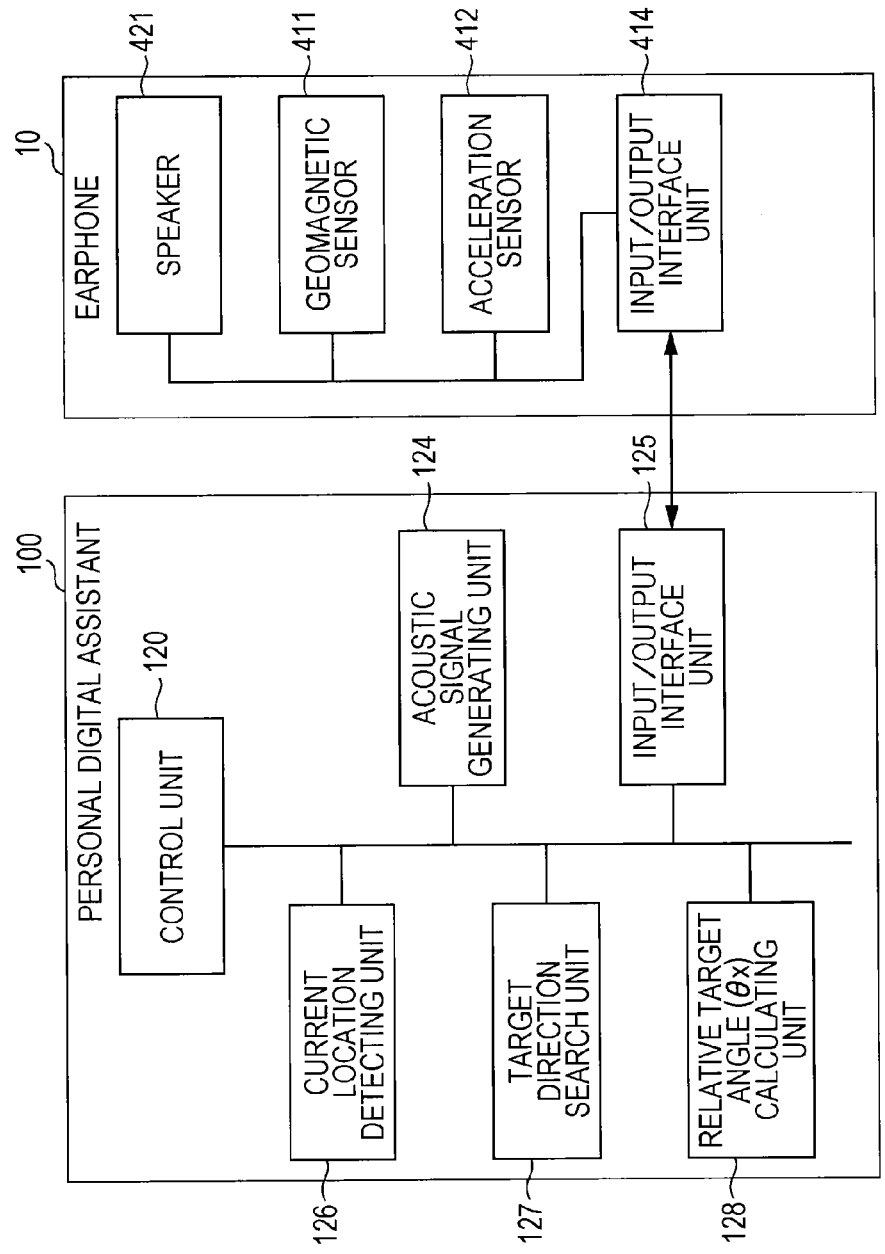
FIG. 13 is a block diagram representing principal functions of the personal digital assistant serving as an acoustic navigation apparatus according to an embodiment of the present disclosure.

FIG. 13 is a block diagram representing principal functions of the personal digital assistant 100 serving as such an acoustic navigation apparatus. The personal digital assistant 100 includes a control unit 120, a current location detecting unit 126, a target direction search unit 127, a relative target angle calculating unit 128, an acoustic signal generating unit 124, and an input/output interface (I/F) unit 125. The headphone 10 to be connected to this personal digital assistant 100 includes a speaker 421, a geomagnetic sensor 411, an acceleration sensor 412, and an input/output interface (I/F) unit 414. The headphone 10 may further include a gyroscope as described above.

The input/output interface (I/F) units 125 and 414 are equivalent to various types of components for cable connection or for wireless connection between the above-mentioned personal digital assistant and the headphone (earphones).

The current location detecting unit 126 of the personal digital assistant 100 includes a position detector configured to detect the current location using the above-mentioned GPS function or the like. The target direction search unit 127 obtains, in response to the user's request, a direction of a destination at the current location as a target direction using a map database or the like, for example.

The relative target angle calculating unit 128 detects an angle made up of the facial orientation of the user wearing the earphone 10, and the reference orientation based on output of the geomagnetic sensor 411 and acceleration sensor 412 obtained from the earphone 10, and also obtains a relative target angle θx that the target direction makes up as to the user's facial orientation as described above.

The acoustic signal generating unit 124 outputs a different mode acoustic signals depending on the obtained relative target angle θx, to the earphone 10. The earphone 10 converts this acoustic signal into sound at the speaker 421 and outputs this as sound waves.

Figure 14:
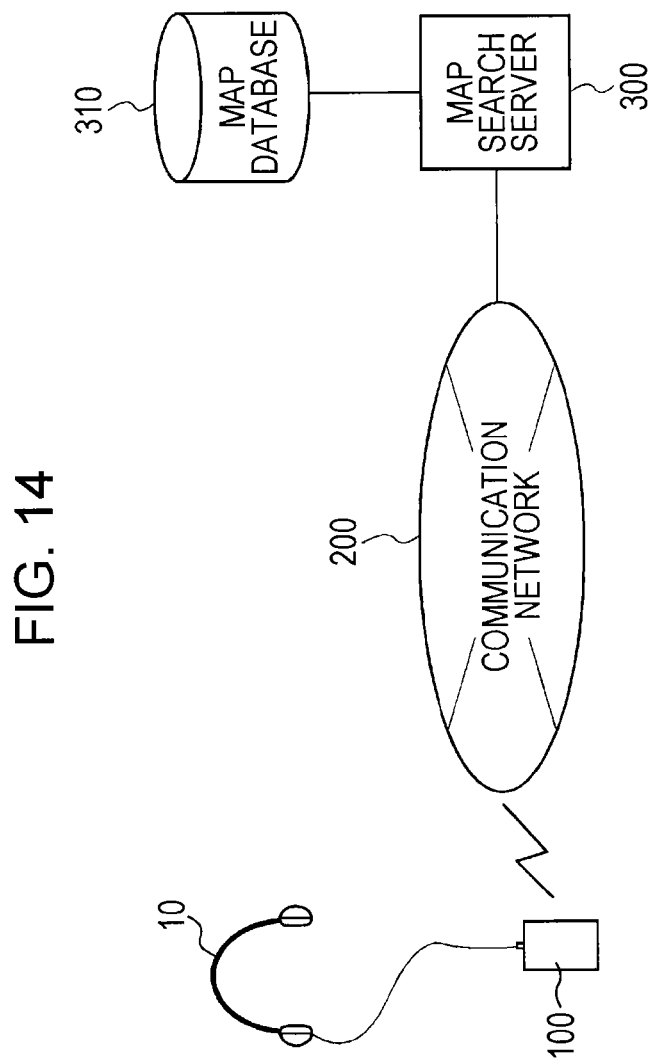
FIG. 14 is a diagram for describing a specific realization example of a target direction search unit in a personal digital assistant according to an embodiment of the present disclosure.

FIG. 14 is a diagram for describing a specific realization example of the target direction search unit 127 in the personal digital assistant 100. With this example, the personal digital assistant 100 is connected to a communication network 200 (e.g., Internet) via the communication circuit 102 and so forth, and accesses a map search server 300 or the like connected to the communication network 200 to perform search of the target direction. For example, the personal digital assistant 100 uses a destination search service that the map search server 300 provides to obtain position information (e.g., latitude longitude) of the destination based on a desired destination search request. The personal digital assistant 100 can display a map on the display screen of the display unit 104 using a map database 310 included in the map search server 300. The destination can be confirmed on this map.

Note that the destination is not necessarily restricted to a geographic name or location number, and may be an optional target such as a building name or facility name or the like. With the present Specification, the direction of such a destination at the current location will be referred to as target direction.

Also, a destination to be used for actual acoustic navigation is not restricted to the final destination, and may be one or multiple intermediate locations (intermediate points) to be passed through until arrival of the final destination.

The map database 310 may be included in the personal digital assistant 100. In this case, map search processing is executed by the control unit 101 or the like.

Next, with the present embodiment, regarding sound to be played as navigation, different modes of an acoustic signal that can be used for a monaural-typed headphone will be described with reference to FIG. 15.

With the present embodiment, the target direction is expressed by a single sound with a predetermined length (e.g., around one second) or short melody being repeatedly (e.g., with a predetermined cycle) played with a different mode. Features thereof are the user's facial orientation (bearing) and an expression method of distance up to a destination. With regard to tone, any tone may be employed as long as this tone is an easy-to-hear sound.

Different mode sounds to be generated according to the relative target angle θx obtained as described above can be determined based on the following rules, for example.

(1) Basically, the mode of sound to be generated is changed according to the size of the relative target angle θx. In the event that the headphone is a monaural type, the target direction is failed to be expressed with the orientation of sound to be generated. Therefore, in order that the user can confirm the correct target direction, when the target direction coincides with a direction where the user faces (facial orientation) within error in a predetermined angle range (e.g., around ±10 degrees), change is applied to playback sound. Specifically, first mode sound 1 to be generated within this predetermined angle range is generated. Also, second mode sound 2 is generated other than this predetermined angle range. With the present embodiment, the second sound is taken as reference sound, and processing such as playing another sound at the same time as the reference sound, raising the pitch of the reference sound, or the like is performed as another sound mode different from the reference sound within this predetermined angle range. Also, when there is difference equal to or greater than 90 degrees between the target direction and a direction where the user faces, i.e., when the user faces the opposite side of the target direction, third mode sound 3 is generated wherein another change different from the above mentioned changes has been applied to the sound to be played. For example, the pitch of the above-mentioned reference sound is lowered, or the tone is changed, whereby the user can clearly understand that the direction is wrong.

In this way, different sound modes are assigned to multiple angle ranges to be determined according to the relative target angle θx, whereby the user can readily find a direction where the user has to move, with change in the facial orientation F, i.e., by rotating the head.

Figure 15:
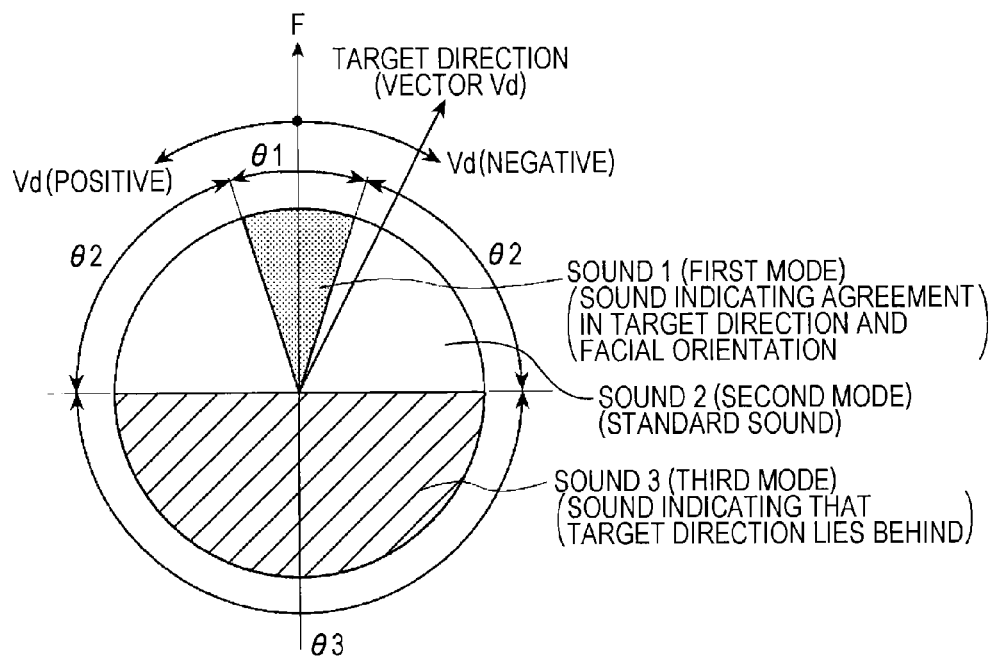
FIG. 15 is a diagram for describing different modes of an acoustic signal that may be used for a monaural-typed headphone regarding sound to be played as navigation in an embodiment of the present disclosure.

With the example in FIG. 15, the sound mode is changed for every multiple angle ranges of the relative target angle θx with the facial orientation F as a reference (angle 0 degrees). With regard to the multiple angle ranges, for example, a relatively narrow range near the facial orientation F (angle 0 degrees), e.g., within a 30-degree opened angle (or within 25 degrees, within 20 degrees, within 15 degrees, or the like) is taken as a first angle range. Next, a range between 90 degrees and −90 degrees other than the first angle range is taken as a second angle range. A range of backward 180 degrees up to −90 degrees rotated in the positive direction from 90 degrees is taken as a third angle range. Note that the number of angle ranges, and angles serving as boundaries are just examples, and the present disclosure is not restricted to these.

(2) Sound modes to be generated from the headphone 10 may include the sound pitch of a single sound to be cyclically generated (frequency), tone, sound intensity (volume), length, a playback interval, an audio message, and an optional combination of these. With the example illustrated in FIG. 15, when the target direction (vector Vd) is included in the first angle range θ1, the sound 1 indicating agreement between the target direction and the user's facial orientation is generated. When the target direction (vector Vd) is included in the second angle range θ2, the sound 2 which is the reference sound is generated. When the target direction (vector Vd) is included in the third angle range θ3, the sound 3 indicating that the target direction is backward is generated. The sound modes may include silence, for example, such that the sound 3 is taken as silence.

Figure 16:
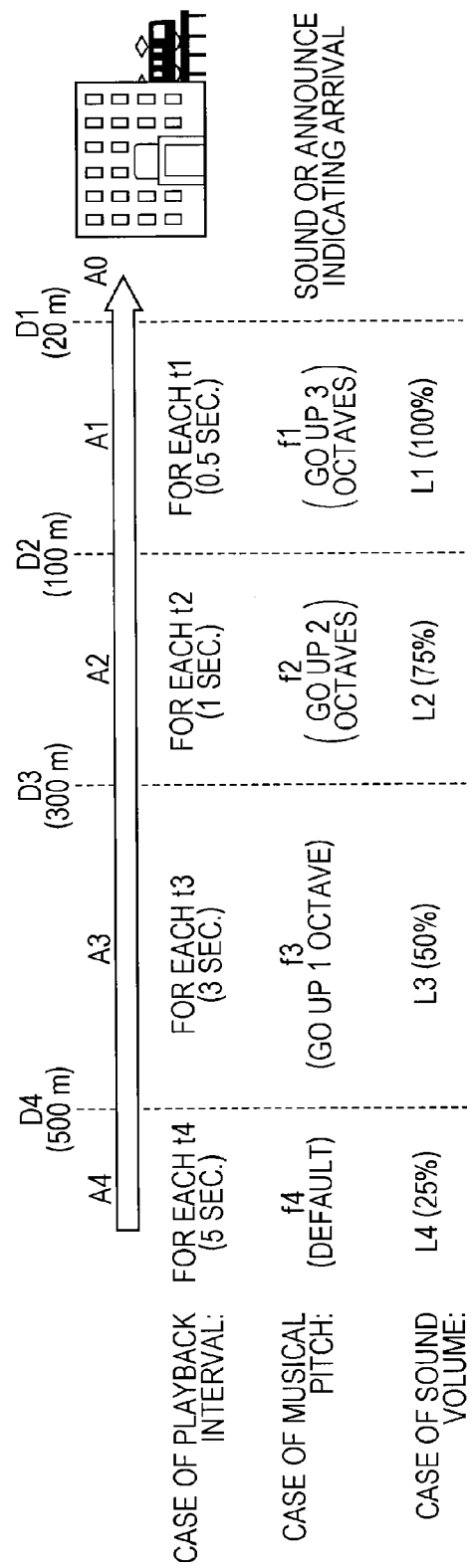
FIG. 16 is a diagram for describing an example wherein distance from the current location to a destination (target) is informed to a user by change in a sound mode in an embodiment of the present disclosure.

Next, an example will be described with reference to FIG. 16 wherein the user is informed of distance D from the current location to a destination (target) by changing the sound mode. This distance D can be obtained from a search result of the map database based on the current location and destination.

With the present embodiment, the user is informed of the current distance to a destination using sound by periodically generating a different mode sound for every predetermined multiple distance ranges. With the example in the drawing, the distance D is divided into multiple areas with multiple boundary distances D1 to D4. Specifically, as the areas, an area A0 less than 20 m, an area A1 equal to or longer than 20 m but less than 100 m, an area A2 equal to or longer than 100 m but less than 300 m, and an area A3 equal to or longer than 300 m but less than 500 m, and an area A4 equal to or longer than 500 m are illustrated as an example. The number of these areas and boundary distances are just examples, and the present disclosure is not restricted to these.

As an example, distance to a destination is expressed with sound playback time interval and sound volume. In the event that the pitch has not been used for the above-mentioned bearing expressions, change in pitch may be used for distance. In the event of a time interval, the closer the distance is, the shorter the time interval is set, and in the event of sound volume, the closer the distance is, the greater the sound volume is set, and in the event of the pitch, the closer the distance is, the higher the pitch is set. At this time, upon the distance and the parameters being linearly changed, the user has difficulty in understanding the change thereof and does not have certainty that the user has come closer to the destination, and accordingly, as illustrated in FIG. 16, for example, the sound is changed in multiple steps of clear sound according to distance, whereby the user can clearly understand distance to the destination in an acoustic manner.

With these multiple areas A0 to A4, a sound mode to be generated from the headphone 10 can optionally be selected out of the above-mentioned sound modes within a range not to conflict with a sound mode generated according to the above-mentioned relative target angle θx. For example, with the example illustrated in FIG. 16, predetermined sound (or announce) indicating arrival to the destination is assigned to the area A0. The sound playback interval is changed from t1 to t4 for the areas A1 to A4, respectively. With the example in the drawing, though 0.5 sec., 1 sec., 3 sec., and 5 sec. are exemplified as t1 to t4, the present disclosure is not restricted to these values. Also, the pitch (sound pitch: frequency) may be changed from f1 to f4 for the areas A1 to A4, respectively. With the example in the drawing, though change in octaves is employed as change in the pitch, the present disclosure is not restricted to this. Moreover, sound volume may be changed from L1 to L4 for the areas A1 to A4, respectively. As examples of L1 to L4, 100%, 75%, 50%, and 25% are exemplified, but the present disclosure is not restricted to these.

As described above, with the present embodiment, the current location is taken as a reference, and the bearing and distance of a destination (or an intermediate point to be passed through) are clearly expressed by sound using the monaural-typed headphone in which the sensors are housed. Thus, an audio navigation function can be provided in an easy-to-understand manner using the simple system.

Next, description will be made regarding an example employing a stereo type headphone according to the present embodiment.

Figure 17:
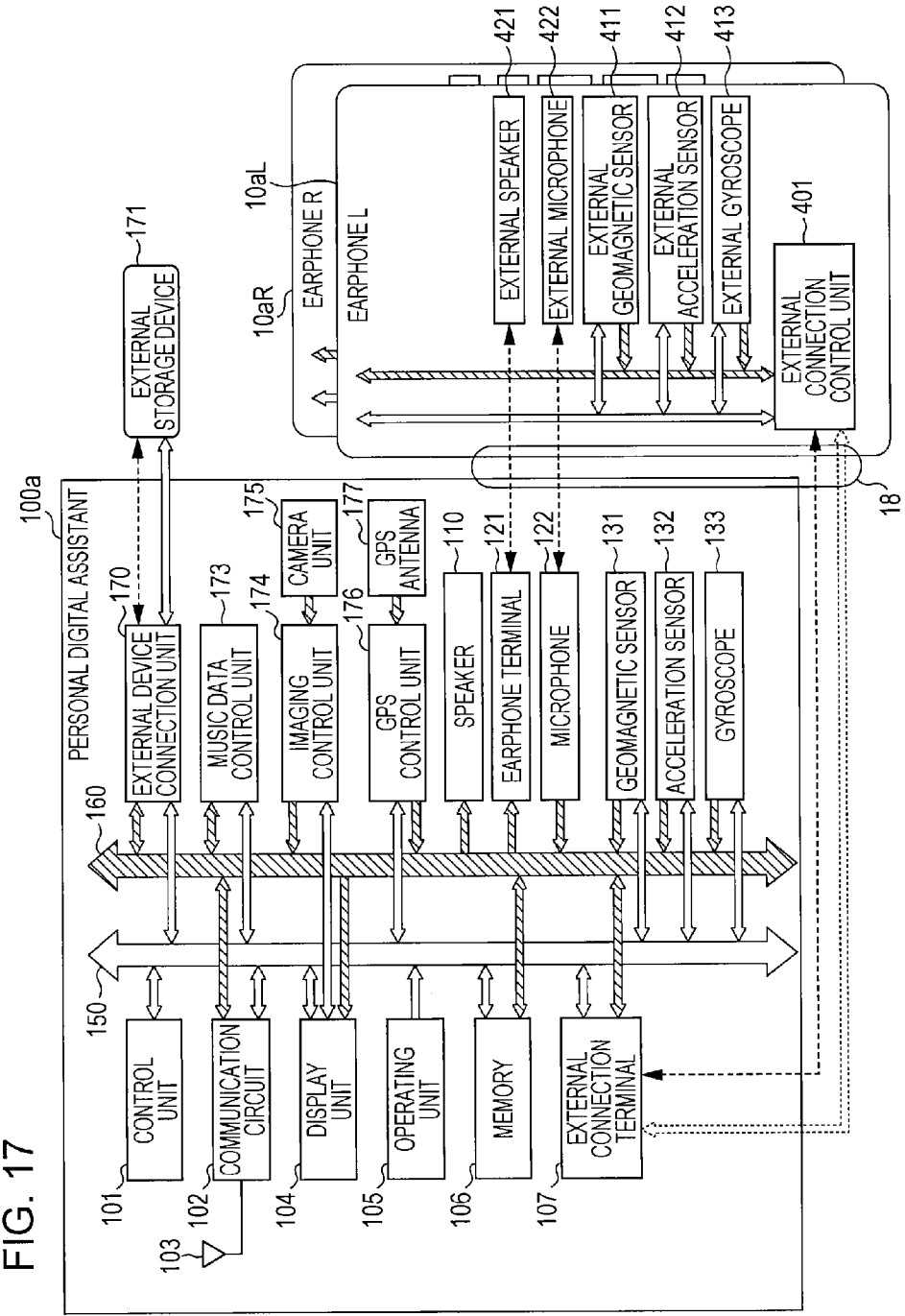
FIG. 17 is a block diagram illustrating a configuration example of a personal digital assistant wherein the monaural-typed headphone illustrated in FIG. 11 has been changed to a stereo type headphone.

FIG. 17 is a block diagram illustrating a configuration example of the personal digital assistant 100a wherein the monaural-typed headphone illustrated in FIG. 11 has been changed to a stereo type headphone. In FIG. 17, components similar to those illustrated in FIG. 11 are denoted with the same reference numerals, and redundant description will be omitted. Though the earphone 10aR may have the same configuration as the earphone 10aL, the earphone 10aR does not have to include the external connection control unit 401, external geomagnetic sensor 411, external acceleration sensor 412, and an external gyroscope 413.

FIG. 18 illustrates a configuration example of the personal digital assistant 100b wherein the monaural-typed headphone illustrated in FIG. 12 has been changed to a stereo type headphone. Components similar to those illustrated in FIG. 12 are denoted with the same reference numerals, and redundant description will be omitted.

The earphone 10bL includes an external wireless communication unit 430 and an external communication antenna 431, and performs wireless communication with an antenna 109 of the wireless communication unit 108 of the personal digital assistant 100b. This wireless communication is short-distance wireless communication, and wireless communication with relatively short-distance is performed using a short-distance wireless communication method, for example, such as Bluetooth (Bluetooth: registered trademark) or the like. Though the earphone 10bR may have the same configuration as the earphone 10bL, the earphone 10bR does not have to include the external connection control unit 401, external geomagnetic sensor 411, external acceleration sensor 412, and an external gyroscope 413. In the event that the earphones 10bR and 10bL are connected, the earphone 10bR has to include neither the external wireless communication unit 430 nor the external communication antenna 431.

Figure 19A:
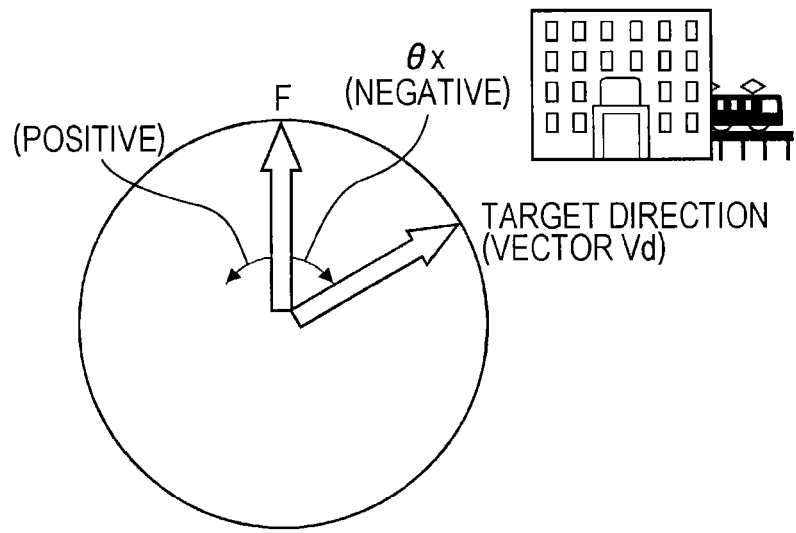
FIGS. 19A and 19B are explanatory diagrams in the event of employing a stereo type headphone, in the case of changing sounds of the left and right earphones according to a target direction.
Figure 19B:
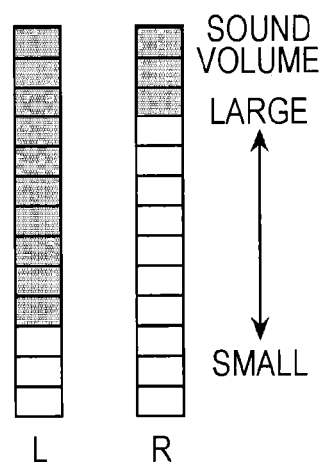

FIGS. 19A and 19B are explanatory diagrams in the event of employing a stereo type headphone, when changing the sound of the left and right earphones according to the target direction for the facial orientation. As illustrated in FIG. 19A, in the event that the relative target angle θx that the target direction (vector Vd) makes up as to the user's facial orientation F is not 0 degrees (or near thereof), control to change sound balance regarding the left and right earphones is performed. For example, control to change sound volume is performed. Specifically, the sound volume of an earphone on a side where the target direction (vector Vd) faces with the facial orientation F as a reference is increased as compared to the sound volume of the other earphone. A ratio between the left volume and the right volume may be changed according to relative target angle θx. For example, the greater the relative target angle θx is, the greater the ratio between the left volume and the right volume is set.

Problems at this time include error of orientation recognition according to human being's audition, and difficulty of anteroposterior sound field reproduction. In general, with regard to sound to be oriented with stereo, in the event that a position to be oriented has completely been swayed to either the left or the right, human beings can correctly recognize orientation, but it is difficult for human beings to recognize accurate orientation at a region other than that. Also, with regard to difference between the forward and the backward, expression on the playing side is also difficult, and the listening side also frequently performs wrong recognition.

Therefore, with the present embodiment, the processing described in FIG. 19 is used together with the processing described in FIG. 15. Specifically, according to angle ranges θ1, θ2, and θ3 of the first, second, third, and so forth to which the relative target angle θx belongs, the sound mode is changed. Along therewith, in the event that the relative target angle θx that the target direction (vector Vd) makes up as to the user's facial orientation F is out of the first angle range θ1 and also included in the second angle range θ2, sound volume is changed regarding the left and right earphones according to which side of the user's right side or left side the target direction is included in.

Thus, it is clearly found that the user's facial orientation F and the target direction (vector Vd) generally agree, and also it is clearly found whether the target direction (vector Vd) is forward or backward. As a result thereof, the user can clearly recognize a direction where the user has to move.

FIG. 20 illustrates a flowchart representing a processing procedure example of first acoustic navigation processing according to the present embodiment. This processing can be executed by the control unit 101 within the personal digital assistant 100 regardless of monaural/stereo headphone and regardless of cable/wireless connection mode. Execution of this processing is started accompanied with activation of an application to perform audio navigation at the personal digital assistant.

First, according to search processing using the above-mentioned map database, or the like, a destination (or a position where the target exists) of acoustic navigation is determined (S11). Thus, latitude longitude information of the destination is obtained.

Thereafter, in the event that there have been received navigation start instructions by the user (S12, Yes), the processing proceeds to the following loop processing.

With loop processing, first, position information (latitude longitude, etc.) at the current location is obtained using current location detection processing using the GPS function and so forth (S13). Next, the user's facial orientation (F) is detected by the above-mentioned method (S14).

Next, based on the latitude longitude of the current location, and the latitude longitude of the destination, the direction of the destination (target direction vector Vd) at the current location is obtained (S15). The order of steps S14 and S15 may be reverse.

Therefore, according to the above-mentioned technique, the angle of the target direction (relative target angle θx) as to the facial orientation (F) is obtained (S16).

Further, distance D from the current location to the destination is obtained using the map database or the like (S17). This step S17 may be executed anywhere between step S13 and step S18.

Based on the relative target angle θx obtained in step S16, and the distance D obtained in step S17, a combination of the above-mentioned different sound modes (acoustic generation pattern) is determined (S18).

In accordance with this determined acoustic generation pattern, acoustic output, i.e., the sound is generated from the headphone (earphones) (S19).

Until the navigation is ended (S20, Yes), the processing is returned to step S13, where the above-mentioned processing steps will be executed. The end of the navigation means arrival to the destination or forced termination according to the user's instructions.

Figure 21:
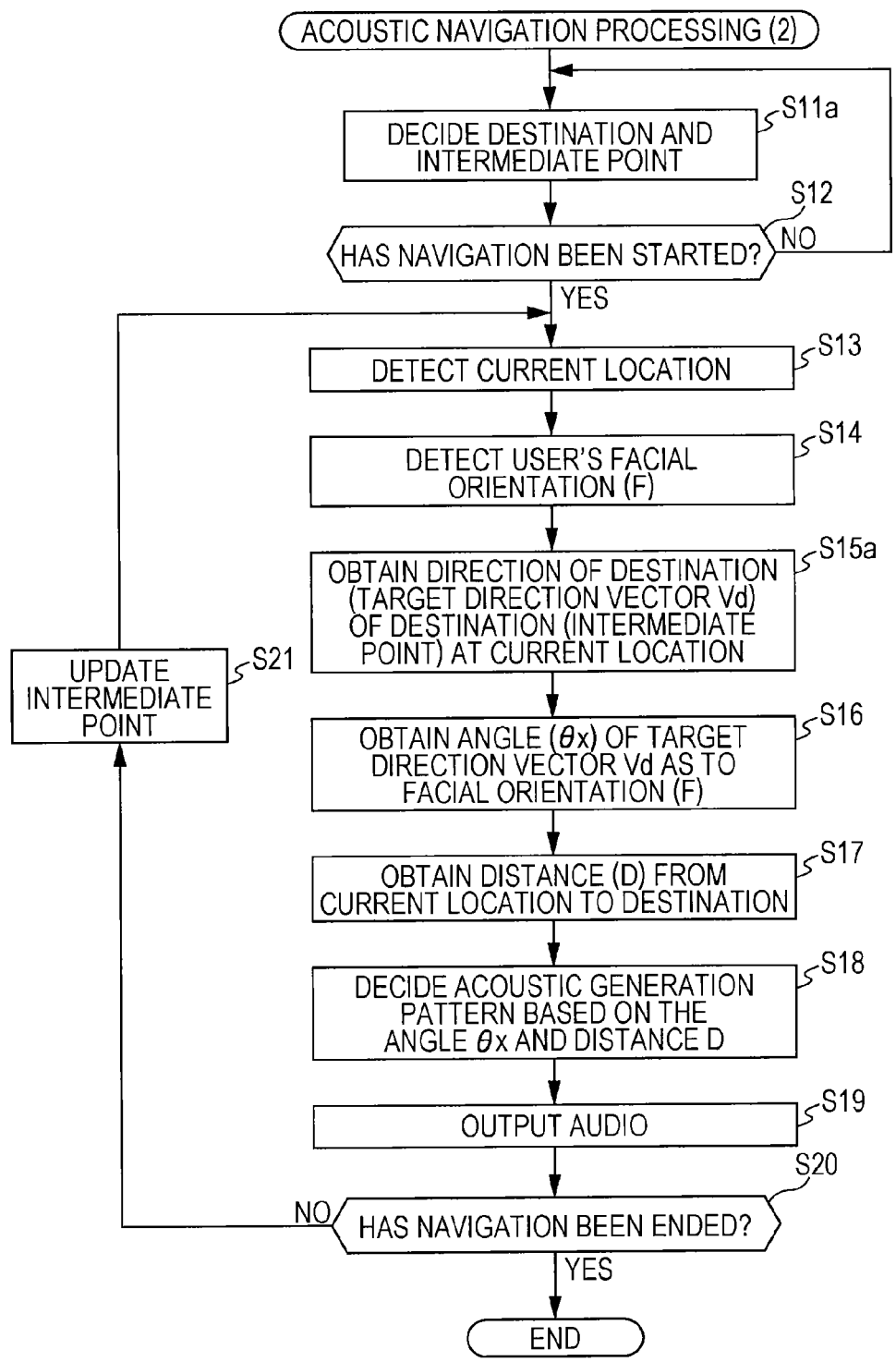
FIG. 21 is a flowchart representing a processing procedure example of second acoustic navigation processing according to an embodiment of the present disclosure.

FIG. 21 illustrates a flowchart representing a processing procedure example of second acoustic navigation processing according to the present embodiment. In FIG. 21, processing steps similar to those illustrated in FIG. 20 are denoted with the same reference numerals and redundant description will be omitted. With destination determination processing in step S11a in FIG. 21, not only the destination but also a principal one or multiple intermediate points between the starting location to the destination are determined. Though an intermediate point determining method is not restricted to particular one, based on a path from the current location to the destination, and progress distance (e.g., for each predetermined progress distance) along the path thereof, an intermediate point can be determined, for example.

At the time of first execution of step S15a thereafter, the target direction (vector Vd) is obtained with the first intermediate point as the destination. In the event that determination is made in step S20 that navigation is continued, the current intermediate point is updated to the intermediate point in the next order (S21), and the processing returns to step S13.

According to the processing in FIG. 21, for example, in the event that the destination is Shinagawa Station, the user can be sequentially navigated regarding each of the intermediate points following the road, to be passed through from the departure location to Shinagawa Station by expressing a direction and distance thereof using sound. As "destination" at the time of obtaining distance D in step S17, there are cases of a case where when there is an intermediate point, the intermediate point is used, and a case where the original destination (determined in step S11a) is used. Both may be selected by the user at the initial setting.

As described above, with the present embodiment, the bearing of the destination (or intermediate point to be passed through) and distance to the destination at the current location, are clearly expressed at the headphone in which the sensors are housed using sound. Thus, an audio navigation function that the user can relatively readily recognize with the simple system can be provided.

Also, whether or not the user is moving can instantly be determined from an output value of the acceleration sensor, whereby discrimination of the user's walking and rearing can be detected. More real-time situation detection and information providing can be performed such as switching navigation contents according to this detection result.

With the above description, in the event that the destination has been determined to be one particular location (e.g., in the event that the destination is Shinagawa Station), and so forth have been assumed. Navigation in this case is to simply perform navigation by expressing the direction and distance of the destination, or an intermediate point following the road to the destination, to be passed through using sound.

However, there may be a case where the destination is not restricted to one location.

For example, there may be a case where as a result of detecting a station existing within a certain range from the current location with the destination being taken as the nearest station, multiple destinations are presented as candidates. In such a case, acoustic navigation may be performed by selecting multiple destinations at the same time without narrowing down destinations to one.

For example, of the first and second destinations (stations), regarding a relation of distance to each of the destinations, the directions of the destinations, and the user's facial orientation, acoustic navigation may be performed using the above-mentioned expressing method. Thus, the user is allowed to move to a desired destination of the candidates. More specifically, an arrangement may be made wherein in the event that the destination has been set as the nearest station, and the first and second stations existing within certain distance from the current location have been obtained as destination candidates, the direction and distance of each thereof are expressed as sound, and the user is allowed to move to an optional station.

In the event that the directions of multiple destinations are relatively closed, and identification of both is difficult, the identification of both may readily be performed such as changing the sound mode according to the multiple destinations (e.g., the first and second stations are expressed with a different sound mode such as different tone or pitch or the like) with determination of an acoustic generation pattern in the above-mentioned step S19. Also, when the first and second stations are included in at least the same angle range, a plurality of generation timing (phases) of sound expressing both may be changed.

Also, based on the angle θx obtained in step S16 and output of the acceleration sensor 12, it may be determined that the user stops and faces one direction (the direction of a particular station) of the multiple target directions (the above-mentioned facial orientation F enters within the first angle range including the target direction). At this time, in step S19, additional information such as the name of the station thereof, arrival and departure time information of the train, and so forth may be played using an audio message. Thus, the user's selection of the destination may also be assisted. The name of the station thereof, and arrival and departure time information of the train may be obtained by the control unit 101 accessing the network at the time of search of the destination or at a predetermined time point thereafter.

When narrowing down the destinations to one location after starting acoustic navigation regarding the multiple destinations, according to a predetermined condition, for example, the user may select one thereof by explicit instructions such as audio instructions from the operating unit 105 or external microphone 422, or the like. Or, the user may select the destination based on the moving direction and distance to the destination of the user. As a determination reference for selection execution thereof, there may be conceived a case where a state in which the user's moving direction follows one of the destinations (including an intermediate point) is continued for a certain period of time. Or, there may be conceived a case where accompanied with the user's movement, decreasing amount difference between distance to the first destination and distance to the second destination is equal to or greater than a predetermined value.

In the event that the destinations have been narrowed down to one, the subsequent acoustic navigation regarding other destinations may be stopped. Also, in the event that the user's explicit instructions, the user's moving direction, or information of distance to the destination has been changed to the other destination side, the stopped destination navigation may be resumed.

Next, a second embodiment of the present disclosure will be described. With the present embodiment, the personal digital assistant 100 including a stereo type headphone including the left and right earphones 10L and 10R as described above is employed. Connection between the headphone and the personal digital assistant 100 may be either by cable or by radio.

The second embodiment relates to an application including sound field reproduction processing to reproduce virtual sound in the virtual world on the headphone as if real sound in the real world instead of an application (program) to perform audio navigation as described in the first embodiment. Generally, with regard to the position of a virtual sound source to generate virtual sound in the virtual world, in the event that virtual sound has been played on the headphone, when the user changes orientation of the face, or moves, the position of the virtual sound source is also changed accompanied therewith.

On the other hand, with the second embodiment, even when reproducing the sound field of the virtual world on the headphone in a manner overlapped with the sound field of the real world, the virtual sound is recognized by the user in sync with the real sound. The "sync" mentioned here means that even when the user positioned within the real world where the real sound exists changes the orientation of the face, or moves, the position of each virtual sound source to generate virtual sound is maintained in a predetermined position as if the real sound source in the real world, the real sound and the virtual sound are blended without uncomfortable feeling.

With the present embodiment, even when the user moves or changes the orientation of the face, the sound field in the virtual world is maintained. Also, even when the user wears the headphone, the sound in the real world (ambient environment) is collected at the stereo microphone, and is mixed with the sound in the virtual world, and is played on the stereo headphone. At this time, the virtual sound source is controlled so as to maintain the sound field of the virtual sound source, whereby the user can reproduce a sound field as if the virtual sound source existed in the real world.

The virtual world is a fictitious world to be provided to the user using a virtual sound source at an amusement facility such as a theme park or amusement park or the like, or attraction hall or the like. Use of the present embodiment is not necessarily restricted to amusement, and may be applied to various applications, such as science, art, education, medical treatment, publicity, advertisement, and so forth.

Figure 22:
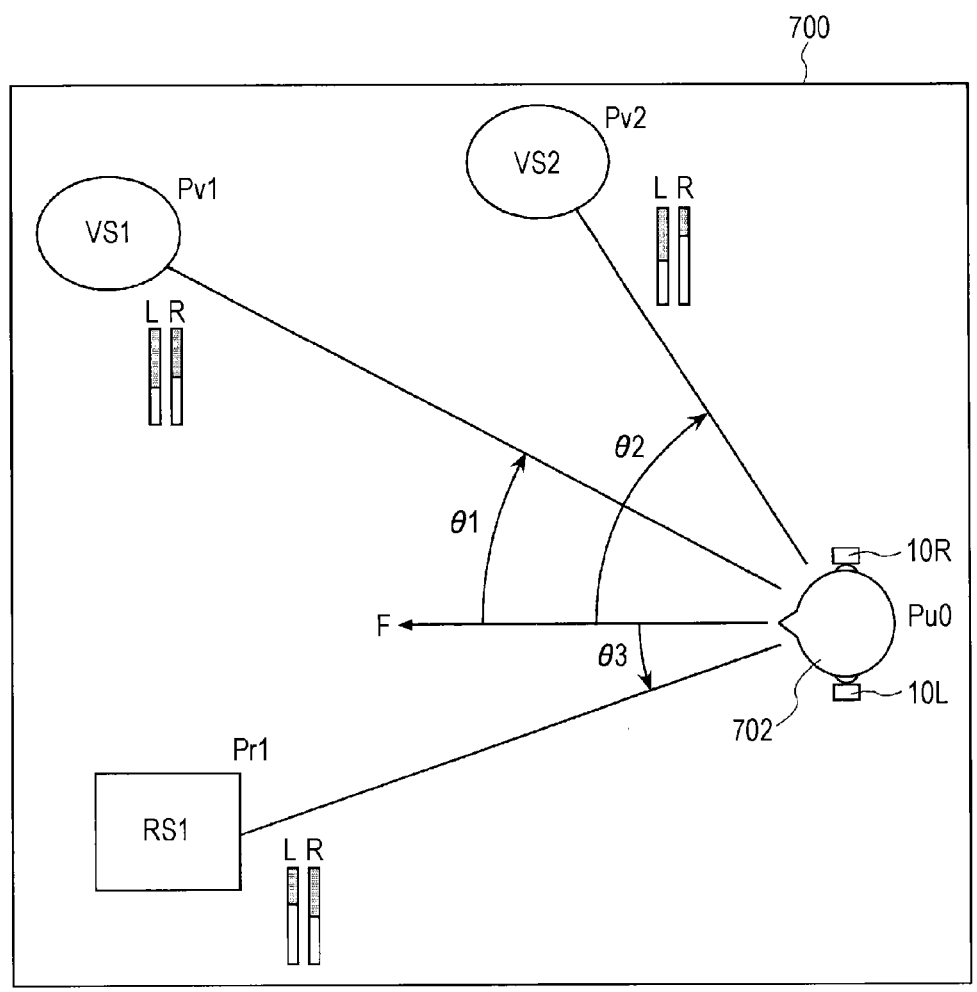
FIG. 22 is a diagram for describing a sound field of the virtual world according to a second embodiment of the present disclosure.

FIG. 22 is a diagram for describing a sound field in the virtual world according to the second embodiment. The virtual world is configured so that at least one virtual sound source is disposed in a predetermined location within a predetermined area 700. With the example in the drawing, a first virtual sound source VS1 and a second virtual sound source VS2 are disposed in already-known locations Pv1 and Pv2, respectively. As for the virtual sound sources, any of music, people's voice, sound, animal's cry, noise, and so forth may be used.

As sound in the real world, i.e., a sound source of the real sound, a first real sound source RS1 alone is illustrated for convenience. However, though not illustrated in the drawing, the real sound source may include a sound source such as an object and an animate (including human) or the like to generate all kinds of sound within an environment where the user is positioned.

With such an environment, a user 702 can move within an area 700, or change the orientation of the face by rotating the head. The user's initial position within the area 700 may be determined to be a predetermined position.

With the state in FIG. 22, the virtual sound source VS1 is positioned in the position Pv1 in the direction of a relative angle θ1 on the right side as to the user 702's facial orientation F (forward) on the horizontal plane, and the virtual sound source VS2 is positioned in the position Pv2 in the direction of a relative angle θ2. Also, a real sound source RS1 is positioned in a position Pr1 of a relative angle θ3 on the left side of the user 702's facial orientation F. In this state, sound is played with left and right balance as illustrated in the drawing regarding each of the sound sources for the user 702. For example, with regard to the virtual sound source VS1, the right volume is played greater than the left volume. With regard to the virtual sound source VS2, right volume is played greater than left volume, but with regard to volume difference, the virtual sound source VS2 is greater than the virtual sound source VS1.

With regard to the real sound source Pr1, sound balance collected at the left and right microphones is played on the left and right earphones without change. Specifically, sound in the actual world (real sound) is collected at the left and right microphones, and the real sound is played with a sound field as heard in the real world at the left and right speakers. With the example in the drawing, the real sound source Pr1 is positioned on the left side of the user's facial orientation F, and accordingly, the collected sound level of the microphone on the left side increases, and the playback sound of the earphone on the left side is played greater than the right side without change.

Figure 23:
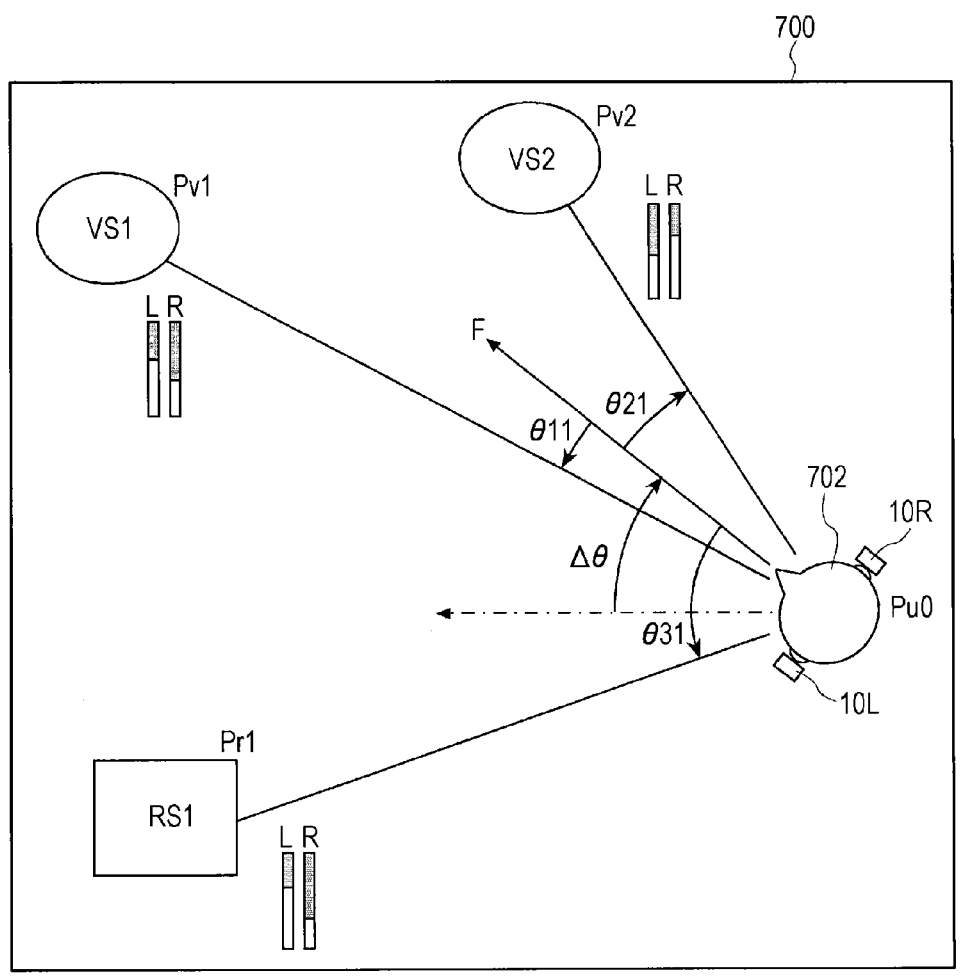
FIG. 23 is a diagram illustrating a state in which the user is in the same position in the state in FIG. 22 but has rotated the head to the right side by an angle Δθ.

FIG. 23 illustrates a state in which the user 702 has rotated the head to the right side by an angle Δθ at the same position from the state in FIG. 22. At this time, for the user, in order to maintain the virtual sound sources VS1 and VS2 as a sound field similar to the real sound source Pr1, the directions of the sound sources have to rotate to the left side by the angle Δθ. With the example in FIG. 22, the virtual sound source VS1 is positioned in the direction of a relative angle θ11 on the left side as to the user's facial orientation F. Also, the virtual sound source VS2 is positioned in the direction of a relative angle θ21 on the right side as to the user's facial orientation F. Therefore, the volume balance of the left and right earphones of each virtual sound source is changed according to a new direction thereof. As compared to the case in FIG. 22, the volume balance of the left and right earphones is reversed regarding the virtual sound source VS1, the right volume of the left and right earphones of the virtual sound source VS2 is greater, but difference between the left volume and right volume is decreased. That is to say, with regard to the virtual sound sources VS1 and VS2, control of each thereof is performed so as to realize such volume balance of the left and right earphones.

The real sound source RS2 is positioned in the direction of a relative angle θ31 on the left side as to the user's facial orientation F. Therefore, with regard to the volume balance of the left and right earphones regarding the real sound source RS2, the volume of the left-side earphone becomes further greater than the right-side volume. Such a real sound source RS2 naturally becomes such a state, and particular control is not performed.

Figure 24:
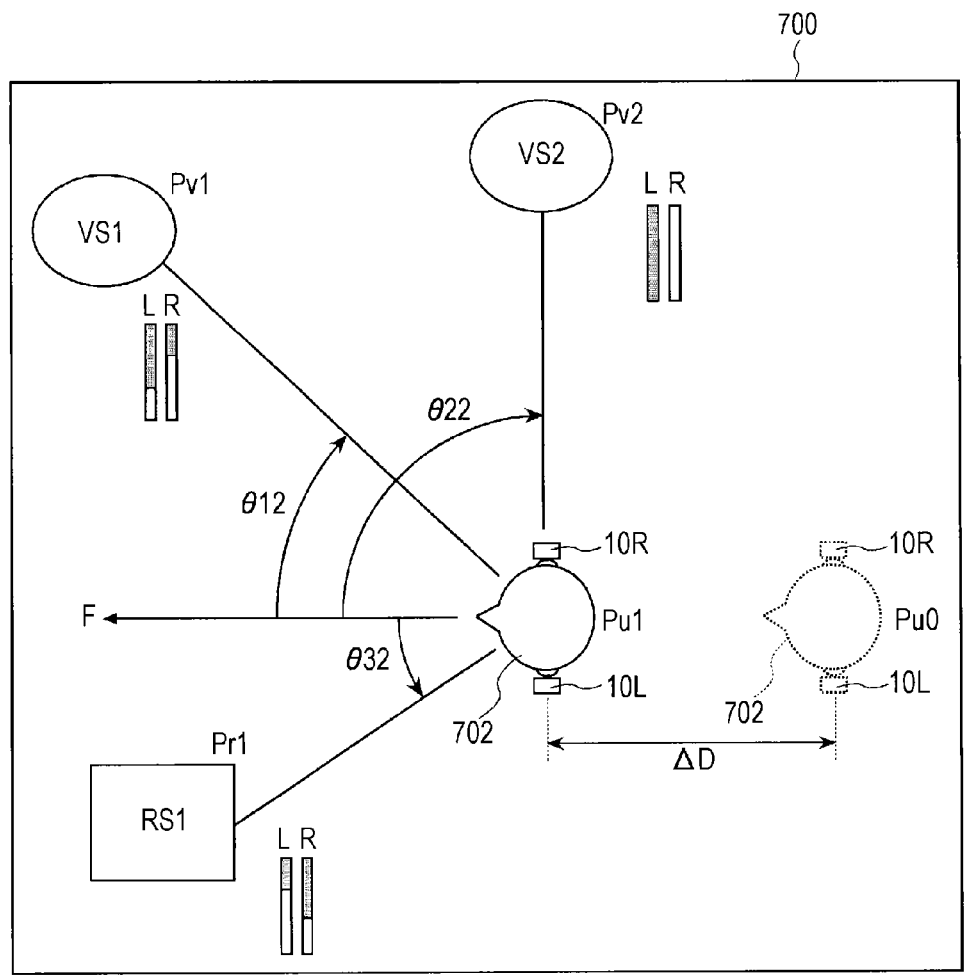
FIG. 24 is a diagram illustrating a state in which the user has moved forward from a position Pu0 to a position Pu1 by ΔD without changing the orientation of the user's face from the state in FIG. 22.

FIG. 24 illustrates a state in which the user 702 moves forward from a position Pu0 to a position Pu1 by ΔD without changing the facial orientation F from the state in FIG. 22.

At this time, if we say that the virtual sound sources VS1 and VS2 do not change within the area 700, the direction of each sound source is changed for the user 702 even when the facial orientation F is unchanged. Specifically, with the state in FIG. 24, for user 702's facial orientation F (forward), the virtual sound source VS1 is positioned in the position Pv1 in the direction of a relative angle θ12 on the right side, and the virtual sound source V2 is positioned in the position Pv2 in the direction of a relative angle θ22. Also, the real sound source RS1 is positioned in the position Pr1 of a relative angle θ32 on the left side of the user's facial orientation F. In this state, sound is played with left and right balance as illustrated in the drawing regarding each of the sound sources for the user 702. That is to say, the virtual sound source VS1 is played with the right volume being grater than the left volume. According to θ12>θ1 being satisfied, volume difference is greater than the case of FIG. 22. The virtual sound source VS2 is also played with the right volume being grater than the left volume, but θ22>θ2 is satisfied, with regard to the volume difference, the virtual sound source VS2 becomes greater than the VS1.

With regard to the real sound source Pr1, θ32>θ3 is satisfied, the volume of the left-side earphone becomes greater than the volume of the right-side earphone. In this case as well, the real sound source RS2 naturally becomes such a state, and to that end, particular control is not performed.

The configuration for realizing operation as described above of the second embodiment will be described below.

Figure 25:
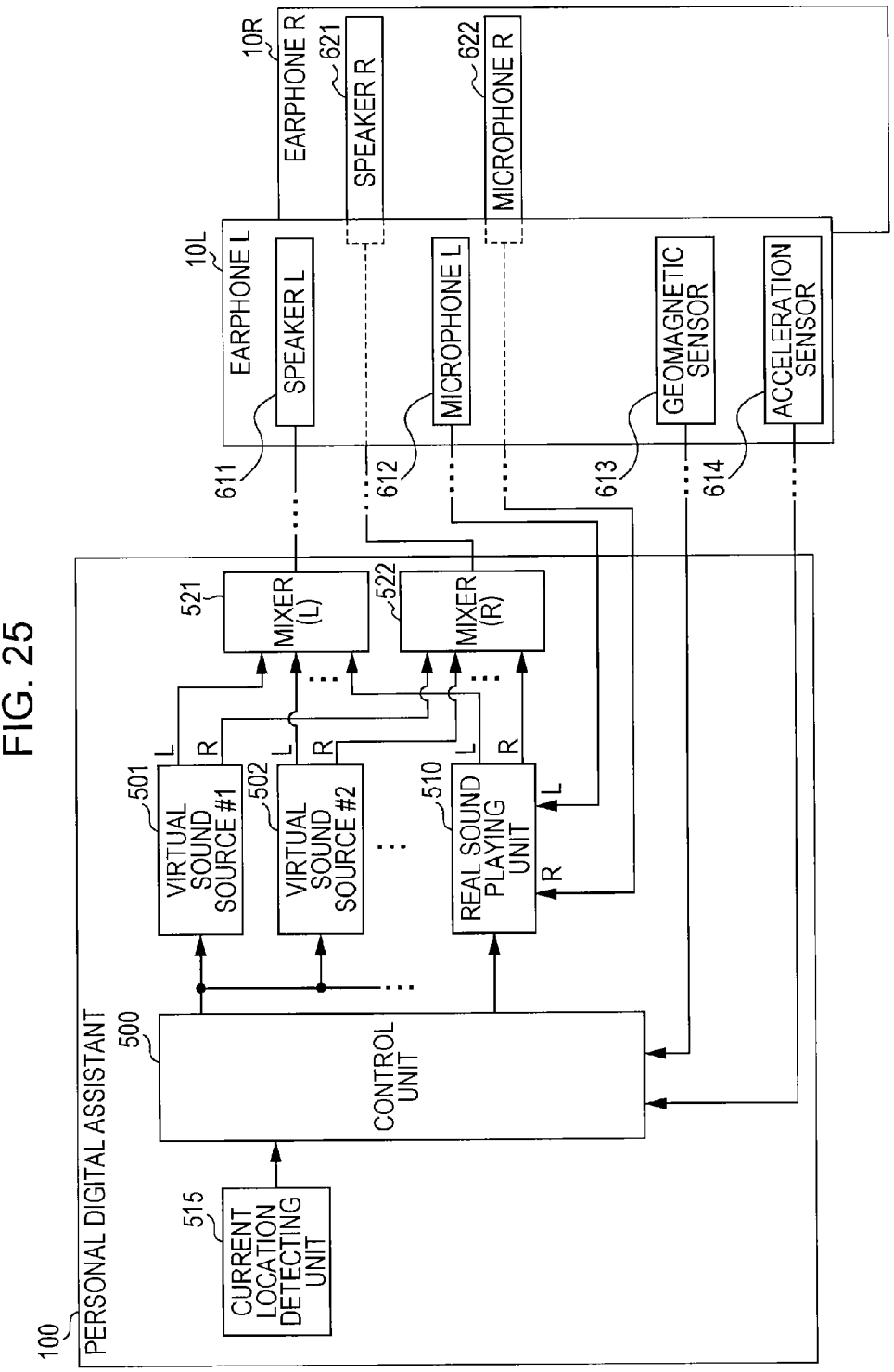
FIG. 25 is a diagram for describing functions of a personal digital assistant and a headphone according to the second embodiment of the present disclosure.

FIG. 25 is a diagram for describing the functions of the personal digital assistant 100 and headphone according to the second embodiment. The configuration of the personal digital assistant 100 is basically the same as indicated in the previous embodiment.

The personal digital assistant 100 includes a control unit 500, virtual sound sources 501 and 502, a real sound playing unit 510, a current location detecting unit 515, and mixers 521 and 522. This drawing illustrates a case where the number of the virtual sound sources is two, but the present embodiment is not restricted to two, and it is sufficient that the number thereof is equal to or greater than one. The number of virtual sound sources and sound modes to be generated therefrom may individually be determined at an application to realize the present embodiment.

The control unit 500 is configured of the above-mentioned control unit 101, and executes control of the units according to the second embodiment and processing to be requested.

The virtual sound sources 501 and 502 correspond to the virtual sound sources VS1 and VS2 illustrated in FIG. 22. The virtual sound sources 501 and 502 output left and right acoustic signals to the mixers 521 and 522, respectively. With this example, position information (e.g., latitude longitude) to determine a position within the area 700 is preset regarding each of the virtual sound sources. Alternatively, a bearing in the initial position of the user 702 within the area 700 may be preset regarding each of the virtual sound sources. The virtual sound sources may play virtual sound by offsetting a direction and distance as viewed from the user according to a control signal from the control unit 500. To that end, left volume and right volume to be generated by a virtual sound source and volume balance are controlled, for example.

The real sound playing unit 510 includes a circuit such as an amplifier configured to receive, under the control from the control unit 500, microphone input signals from the left and right earphones 10L and 10R, and to output to the mixers 521 and 522 as left and right audio signals.

Left and right acoustic signals from the mixers 521 and 522 are transmitted to speakers 611 and 621 of the earphones 10L and 10R, respectively.

The current location detecting unit 515 is a function unit to detect the current location of the user carrying the personal digital assistant 100, and is configured of the GPS control unit 176 and GPS antenna 177 as described above.

The control unit 500 receives output of a geomagnetic sensor 613 and an acceleration sensor 614 of one of the earphones (left earphone 10L in this example), and obtains the user's facial orientation F at that time. Also, based on the position information of each virtual sound source provided from the application, and the current location information obtained from the current location detecting unit 515, the control unit 500 may obtain the direction of each virtual sound source from the user's current location. Therefore, the angle of the direction of each virtual sound source as to the user's facial orientation F may be obtained.

The left earphone 10L of the headphone includes a speaker 611, a microphone 612, a geomagnetic sensor 613, and an acceleration sensor 614. As described in the first embodiment, the gyroscope 13 may secondarily be used together. The earphone 10R includes a speaker 621 and a microphone 622. The earphone 10R has to include neither the geomagnetic sensor 613 nor the acceleration sensor 614. In the event that both of the left and right earphones 10L and 10R include the geomagnetic sensor 613 and acceleration sensor 614, it is sufficient to use the sensors of one of the earphones.

In the event that the user's initial position within the area 700 has been determined to be a predetermined position, based on output of the acceleration sensor 613, the moving direction and moving amount from the initial position are cumulatively confirmed, whereby the user's new current location can be obtained. In this case, the current location detecting unit 515 employing the GPS function does not have to be used.

The user's facial orientation F may be detected, in the same way as described in the first embodiment, based on at least output of the geomagnetic sensor 613 and acceleration sensor 614. With the present embodiment, difference between the volume of the left earphone and the volume of the right earphone is taken as a function of a relative angle $\theta$ in the direction of a virtual sound source as to the user's facial orientation F. More specifically, for example, the closer to the orientation F the relative angle $\theta$ is, the smaller volume difference between the left and right is set, and the closer to a direction perpendicular from the orientation F the relative angle $\theta$ is, the greater volume difference between the left and right is set.

Figure 26:
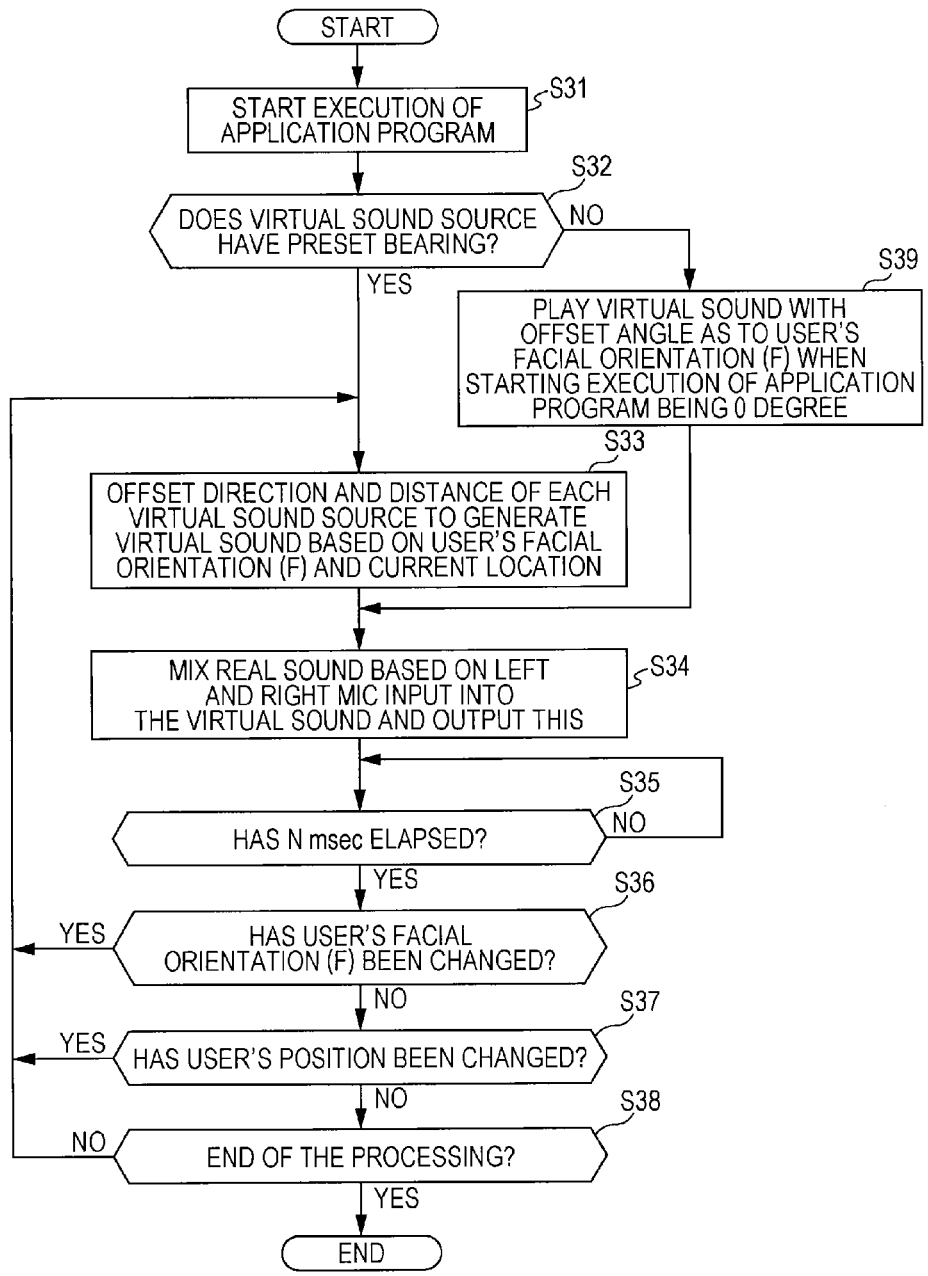
FIG. 26 is a flowchart representing a processing example by a control unit according to the second embodiment of the present disclosure.

FIG. 26 illustrates a processing example to be executed by the control unit 500 according to the second embodiment, as a flowchart.

The second embodiment is not an application (program) to perform audio navigation as described in the first embodiment but an application including sound field reproduction processing to reproduce virtual sound in the virtual world on the headphone as if real sound in the real world.

With the processing in FIG. 26, according to the user's operation or external instructions, execution of the present application is started (S31).

With this application, confirmation is made whether or not a preset bearing is included in the virtual sound sources (S32). In the event that a preset bearing is not included, virtual sound is played with an offset angle 0 degrees as to the user's facial orientation F at the time of starting of execution of the application (S39). The offset 0 degrees means to perform playback of virtual sound without changing the initial direction of each virtual sound source as to the user's facial orientation F. Thereafter, the processing proceeds to step S34.

In the event that a preset bearing is included in the virtual sound sources, the processing proceeds to step S33. In step S33, based on the current user's facial orientation F and the current location, virtual sound is created by offsetting the direction and distance of each of the virtual sound sources. At the time of transition from step S32, virtual sound is played by offsetting the direction of each of the virtual sound sources with the above-mentioned preset bearing. As described above, according to the direction of each of the virtual sound sources, balance of left and right playback sound of this virtual sound source is decided. An arrangement may be made wherein distance to each of the virtual sound sources is obtained from the current location, and the (left and right) volume of this virtual sound source is changed according to this distance. For example, the closer the distance is, the greater the volume of the virtual sound source is set.

Next, in step S34, based on the current left and right microphone input, the real sound in the real world is played and output by being mixed with the virtual sound.

Thereafter, after elapse of a predetermined short period of time (N msec) (S35), the current user's facial orientation F is confirmed to confirm whether or not there has been significant change from the facial orientation F at the time of the previous confirmation (S36). The significant change means that the facial orientation F has been changed by a predetermined angle (e.g., one degree through around several degrees) or wider. In the event that there has been significant change, the processing returns to step S33.

In the event that there has not been significant change regarding the facial orientation F, the user's current location is confirmed to confirm whether or not there has been significant change from the position at the time of the previous confirmation (S37). This significant change means that the position has been changed by predetermined distance (e.g., several tens cm through around 1 m) or longer.

In the event that there has been change in the user's position, the processing returns to step S33. In the event that end of the present application has been detected by the user's operation or external instructions or the like, the present processing is ended, or otherwise, the processing returns to step S33.

When returning to step S33 from step S36/S37/S38, based on the user's facial orientation F and the current location at the time, the direction and distance of each of the virtual sound sources is updated, and virtual sound is played based on the updated results.

According to such processing, even when the user moves or changes the facial orientation within the area 700 where the virtual sound sources are disposed, a mutual relation between the real sound in the real world and the virtual sound in the virtual world can be maintained.

Note that, with the above-mentioned description in the second embodiment, the virtual sound sources have been assumed to be fixed. However, the positions of the virtual sound sources may be changed. In this case, at the time of execution of step S33, the direction and distance of each of the virtual sound sources is obtained with the user's position and facial orientation as a reference in the light of the position of each of the virtual sound sources at that time, and control of the virtual sound sources is performed based on these.

Also, though the virtual sound sources have been prepared within the personal digital assistant, an arrangement may be made wherein the virtual sound sources are disposed in an external server (not illustrated) which is accessible from the personal digital assistant by wireless connection, and the acoustic signal and preset bearing and position information of a virtual sound source are obtained from this server. Superimposing of real sound as to virtual sound is not a vital element, and there may be an embodiment to perform playback of virtual sound alone in some cases.

Figure 27:
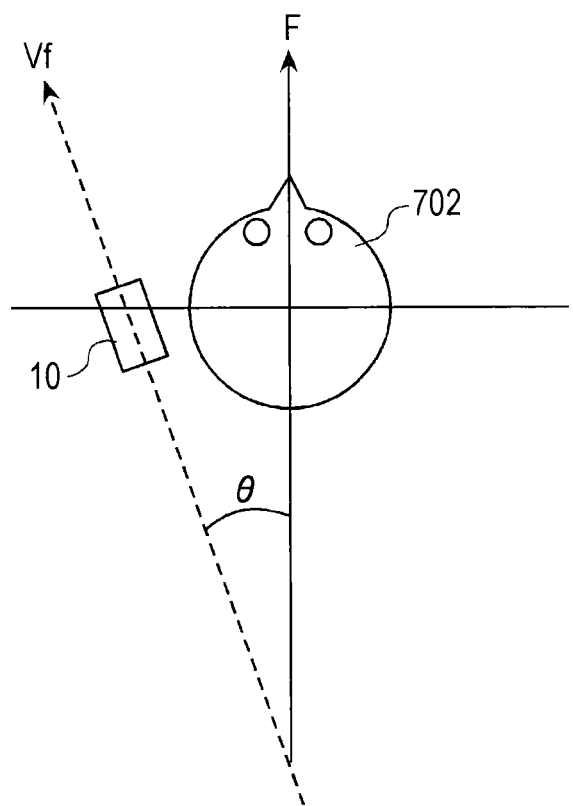
FIG. 27 is a diagram for describing a method to more accurately obtain orientation of a user's face F in the first and second embodiments.

Hereafter, description will be made regarding a method to more accurately obtain the user's facial orientation F. As illustrated in FIG. 27, in a state in which the earphone 10 is worn on the user 702's head, the forward direction (Vf) of the earphone 10 does not necessarily coincide with the user's facial orientation F. Therefore, when the user wears the earphone 10, based on the output of the acceleration sensor 12, an angle difference θ between the forward direction vector Vf on the horizontal plane and the facial orientation F is obtained and stored. Hereafter, while wearing the earphone, the direction of the forward vector Vf is corrected with the angle difference θ, whereby the accurate user's facial orientation F at that time can be obtained. Also, a bearing where the user faces at that time can be obtained with reference to output of the geomagnetic sensor.

Figure 28:
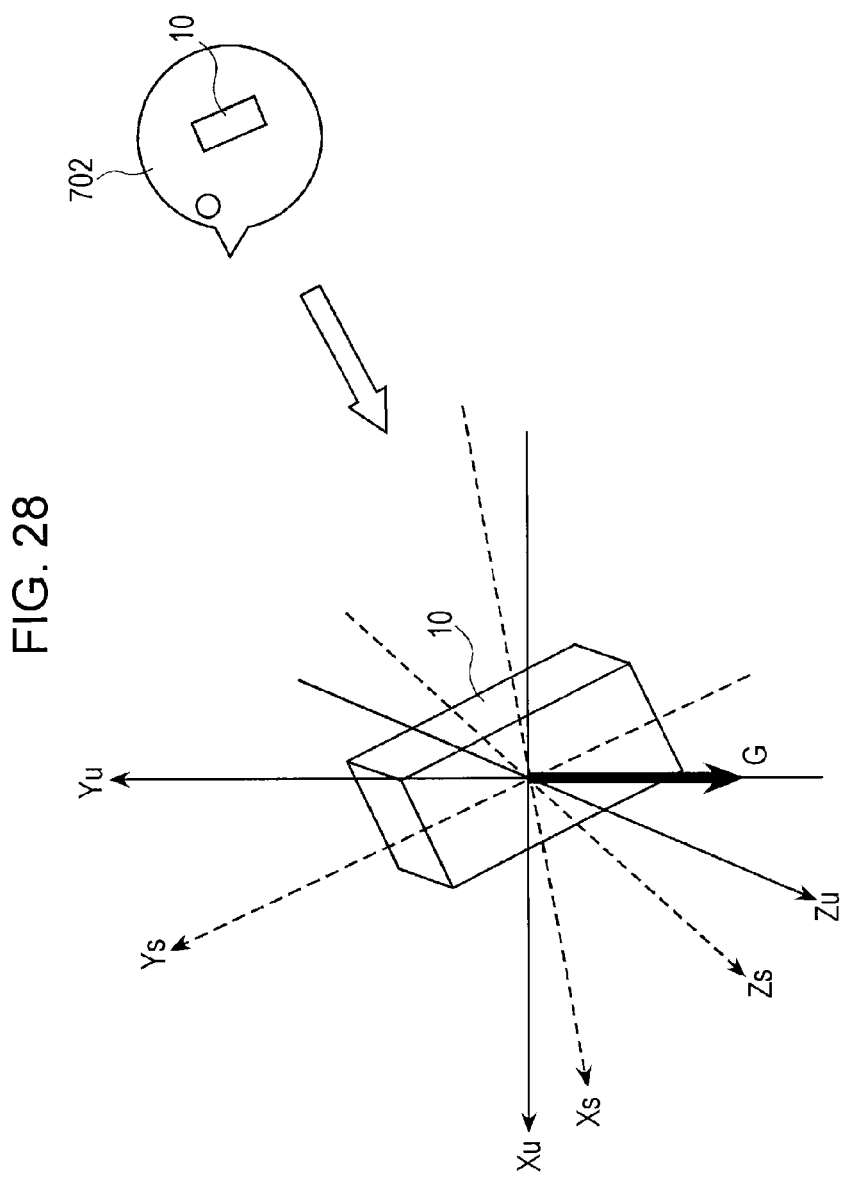
FIG. 28 is a diagram illustrating a state in which a user wears earphones, and a sensor coordinate system and a user coordinate system in this state.

FIG. 28 illustrates a state in which the user 702 wears the earphone 10, and a sensor coordinate system and a user coordinate system in the state thereof again. Gravity vectors G as viewed from the coordinate spaces thereof are represented with the following Expressions (1) and (2), respectively.

[Math. 1]

$$Gu = \begin{pmatrix} Gxu \\ Gyu \\ Gzu \end{pmatrix} \quad (1)$$

[Math. 2]

$$Gs = \begin{pmatrix} Gxs \\ Gys \\ Gzs \end{pmatrix} \quad (2)$$

Figure 29:
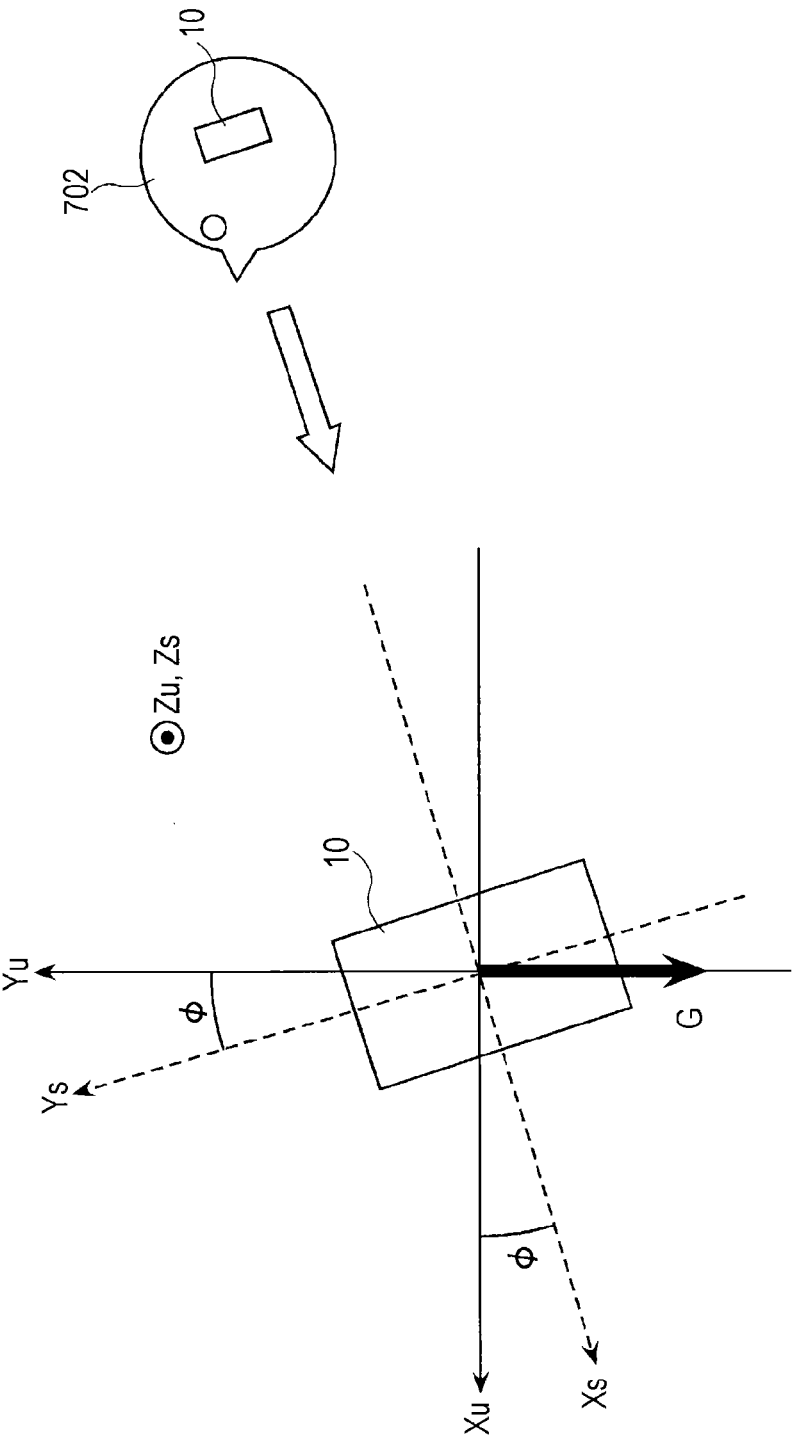
FIG. 29 is a diagram for describing an expression representing axial conversion according to rotation around the Z axis of the earphone.

As illustrated in FIG. 29, axis transformation according to rotation around the Z axis of the earphone 10 is as indicated in the following Expression (3).

[Math. 3]

$$\begin{pmatrix} Gxs \\ Gys \\ Gzs \end{pmatrix} = \begin{pmatrix} Gxu \\ Gyu \\ Gzu \end{pmatrix} \begin{pmatrix} \cos\phi & -\sin\phi & 0 \\ \sin\phi & \cos\phi & 0 \\ 0 & 0 & 1 \end{pmatrix} \quad (3)$$

Here, angle $\phi$ represents an inclination angle around the Z axis of the Ys axis of the earphone 10 as to the Yu axis. At this time, the Zs axis and Zu axis are considered to approximately agree. Gxs, Gys, and Gzs are the axial components of the gravity vector G in the sensory coordinate system, and Gxu, Gyu, an Gzu are the axial components of the gravity vector G in the user coordinate system.

Similarly, as illustrated in FIG. 30, axis transformation according to rotation around the X axis of the earphone 10 is as indicated in the following Expression (4).

[Math. 4]

$$\begin{pmatrix} Gxs \\ Gys \\ Gzs \end{pmatrix} = \begin{pmatrix} Gxu \\ Gyu \\ Gzu \end{pmatrix} \begin{pmatrix} 1 & 0 & 0 \\ 0 & \cos\psi & -\sin\psi \\ 0 & \sin\psi & \cos\psi \end{pmatrix} \quad (4)$$

Here, angle $\psi$ represents an inclination angle around the X axis of the Ys axis of the earphone 10 as to the Yu axis. At this time, the Xs axis and Xu axis are considered to approximately agree.

Figure 31:
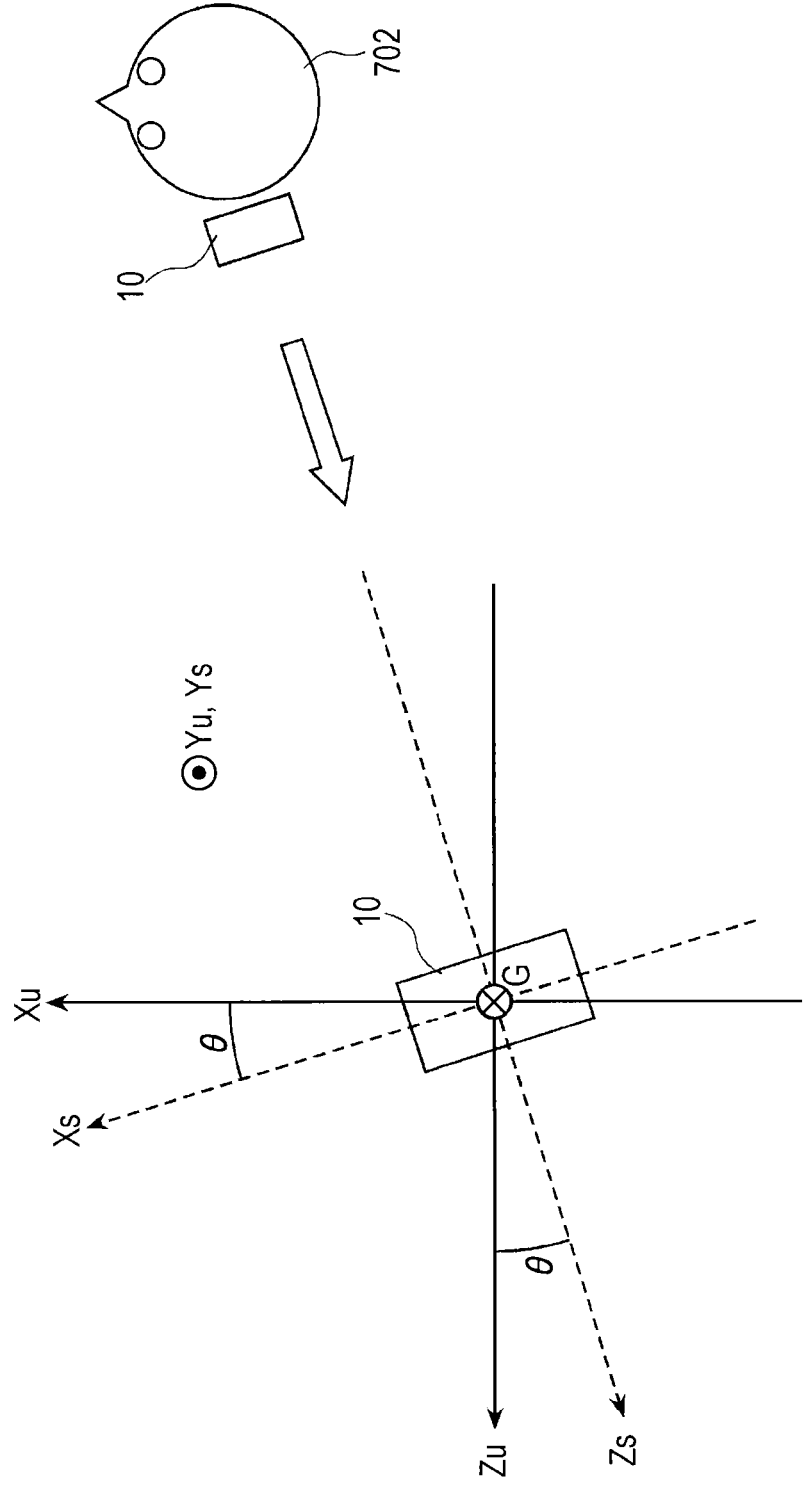
FIG. 31 is a diagram for describing an expression representing axial conversion according to rotation around the Y axis of the earphone.

Further, similarly, as illustrated in FIG. 31, axis transformation according to rotation around the Y axis of the earphone 10 is as indicated in the following Expression (5).

[Math. 5]

$$\begin{pmatrix} Gxs \\ Gys \\ Gzs \end{pmatrix} = \begin{pmatrix} Gxu \\ Gyu \\ Gzu \end{pmatrix} \begin{pmatrix} \cos\theta & 0 & \sin\theta \\ 0 & 1 & 0 \\ -\sin\theta & 0 & \cos\theta \end{pmatrix} \quad (5)$$

Here, angle θ represents an inclination angle around the Y axis of the Xs axis of the earphone 10 as to the Xu axis. At this time, the Ys axis and Yu axis are considered to approximately agree.

Axis transformation with three angles $\phi$, $\psi$, and θ in Expressions (3), (4), and (5) being taken into consideration is as indicated in the following Expression (6).

[Math. 6]

$$\begin{pmatrix} Gxs \\ Gys \\ Gzs \end{pmatrix} = \quad (6)$$

$$\begin{pmatrix} Gxu \\ Gyu \\ Gzu \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} 1 & 0 & 0 \\ 0 & \cos\psi & -\sin\psi \\ 0 & -\sin\psi & \cos\psi \end{pmatrix} \begin{pmatrix} \cos\theta & 0 & \sin\theta \\ 0 & 1 & 0 \\ -\sin\theta & 0 & \cos\theta \end{pmatrix} =$$

$$\begin{pmatrix} Gxu(\cos\phi\cos\theta - \sin\phi\cos\psi\sin\theta) - \\ Gyu(\sin\phi\cos\psi) + Gzu(\cos\phi\sin\theta + \sin\phi\sin\psi\cos\theta) \\ Gxu(\sin\phi\cos\theta + \cos\phi\sin\psi\sin\theta) + Gyu(\cos\phi\cos\psi) + \\ Gzu(\cos\phi\sin\theta + \sin\phi\sin\psi\cos\theta) \\ -Gxu(\cos\psi\sin\theta) + Gyu(\sin\psi) + Gzu(\cos\psi\cos\theta) \end{pmatrix}$$

Now, if we say that a constant representing the absolute value of the gravity is g, the following Expression (7) is obtained.

[Math. 7]

$$Gu = \begin{pmatrix} Gxu \\ Gyu \\ Gzu \end{pmatrix} = \begin{pmatrix} 0 \\ -g \\ 0 \end{pmatrix} \quad (7)$$

Upon substituting this Gu for Expression (6), the following Expression (8) is obtained.

[Math. 8]

$$\begin{pmatrix} Gxs \\ Gys \\ Gzs \end{pmatrix} = \begin{pmatrix} g\sin\phi\cos\psi \\ -g\cos\phi\cos\psi \\ -g\sin\psi \end{pmatrix} \quad (8)$$

Here, g is a constant, and the values Gxs, Gys, and Gzs of the axes of Gs are found from output of the acceleration sensor, whereby the angles $\phi$ and $\psi$ can be calculated. However, the angle $\theta$ is failed to be calculated.

Figure 32:
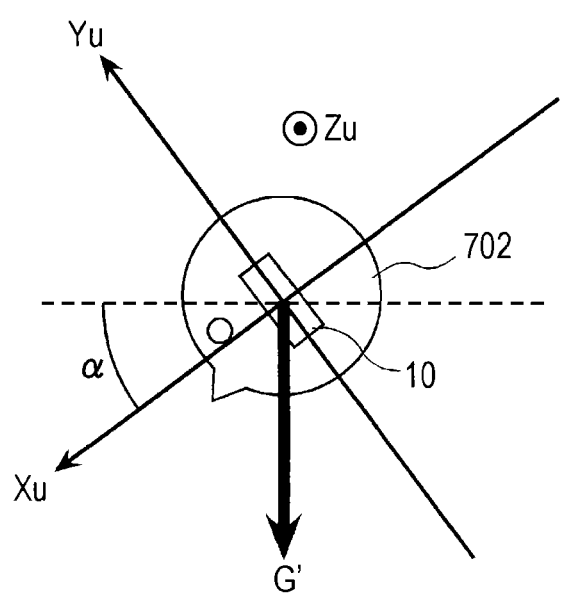
FIG. 32 is a diagram for describing nodding action at the time of a user wearing earphones.

Therefore, as illustrated in FIG. 32, the user is made to execute a nodding action when wearing the earphone. The nodding action in the present Specification means an action wherein the user stares straight ahead from his/her body, rotates the head forward by a predetermined angle or greater, and then returns to the original upright position. According to this action, a vertical plane in which a vector representing the user's facial orientation F is included is determined.

More specifically, at the time of this nodding action, the maximum rotation angle $\alpha$ of the user's head as to the horizontal plane (Xu-Yu plane) is obtained. Description will be made later regarding how to obtain this angle $\alpha$. Let us say that the gravity vector at the time of this maximum rotation angle $\alpha$ is taken as a gravity vector G'. G'u is represented as the following Expression (9).
[Math. 9]

$$G'u = \begin{pmatrix} G'xu \\ G'yu \\ G'zu \end{pmatrix} = \begin{pmatrix} g\sin\alpha \\ -g\cos\alpha \\ 0 \end{pmatrix} \quad (9)$$

Upon substituting this G'u (i.e., G'xu, G'yu, and G'zu) for the above-mentioned Expression (6), the following Expression (10) is obtained.
[Math. 10]

$$\begin{pmatrix} G'xs \\ G'ys \\ G'zs \end{pmatrix} = \begin{pmatrix} g\sin\alpha(\cos\phi\cos\theta - \sin\phi\cos\psi\sin\theta) + g\cos\alpha(\sin\phi\cos\psi) \\ g\sin\alpha(\sin\phi\cos\theta + \cos\phi\sin\psi\sin\theta) - g\cos\alpha(\cos\phi\cos\psi) \\ -g\sin\alpha(\cos\psi\sin\theta) - g\cos\alpha(\sin\psi) \end{pmatrix} \quad (10)$$

The values of G's (i.e., G'xs, G'ys, and G'zs) are obtained from the output values of the acceleration sensor, and the values of the angles $\phi$ and $\psi$ have already been known from the state before the user had nodded. As a result thereof, the angle $\theta$ can be calculated.

Figure 33:
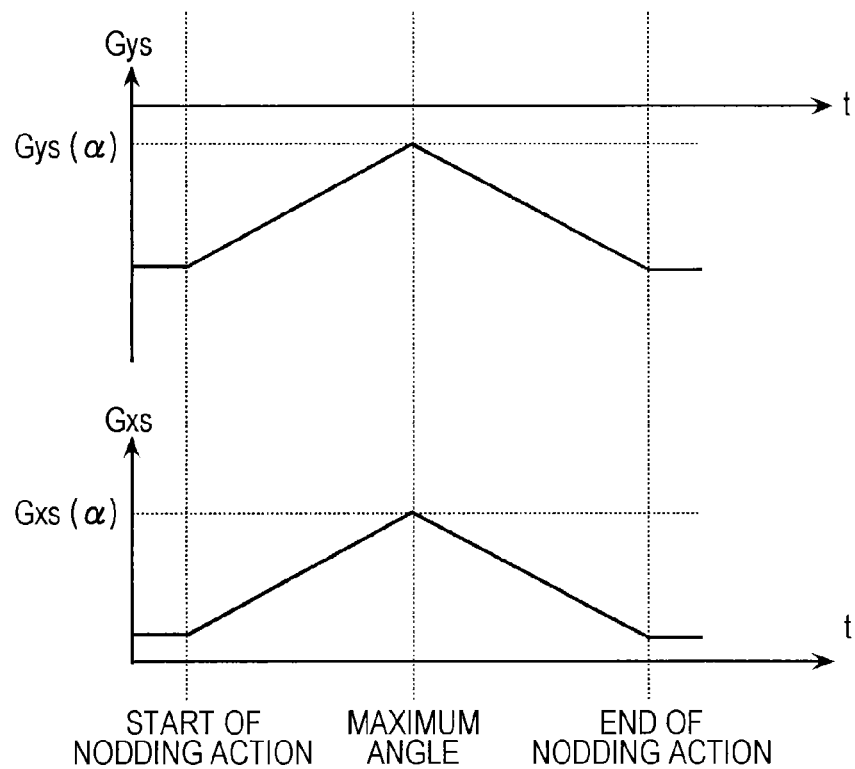
FIG. 33 is a graph representing change in acceleration components Gys (α) and Gxs (α) according to the gravity at the time of a user's nodding action.

Now, how to obtain the maximum nodding angle $\alpha$ will be described. FIG. 33 illustrates a graph representing change in acceleration components Gys ($\alpha$) and Gxs ($\alpha$) according to the gravity at the time of a nodding action. Both graphs are obtained by monitoring the outputs of the X axis and Y axis of the acceleration sensor with a predetermined sampling cycle for a predetermined period of time. As can be understood from the drawing, a maximal value is output as sensor output at the time of the maximum nodding angle $\alpha$. Therefore, the angle $\alpha$ can be obtained by monitoring the maximal value thereof.

The reason why the maximal value is used is because the precision of an angle to be calculated is deteriorated due to noise of an acceleration value according to moment of inertia during rotation of the acceleration sensor according to a nodding action other than the maximal value. At the time of the maximum angle, the operation of the acceleration sensor is temporarily stopped, and noise becomes the minimum.

Figure 34:
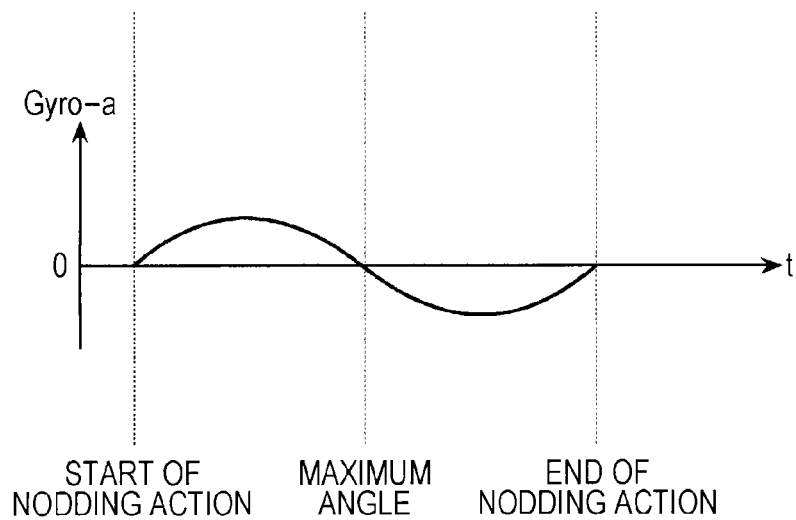
FIG. 34 is a graph representing change of output Gyro-a of the gyroscope at the time of a user's nodding action.

In order to further improve the detection precision of the angle $\alpha$, the gyroscope may be employed. The value of output Gyro-a of the gyroscope at the time of taking the rotation direction of the gyroscope in a nodding action as around an a axis changes similar to a sine wave as illustrated in FIG. 34 at the time of a nodding action. At the time of the nodding action of the user's head reaching the maximum angle, the rotation of the gyroscope is stopped, and output thereof becomes 0. Therefore, output of the acceleration sensor at timing when the output Gyro-a of the gyroscope becomes 0 is read, whereby the angle $\alpha$ can more accurately be calculated. However, with the present disclosure, use of the gyroscope is not vital.

The nodding action is executed by the user as the initial action at the time of starting execution of an application using the user's facial orientation F which is an application to be used by wearing the earphones (headphone), or at a predetermined time point such as at the time of connecting the earphone to the personal digital assistant, or the like. To that end, at this predetermined time point, each time thereof, the user may be explicitly instructed to perform a nodding action by a user interface according to display or sound (or voice). Or, this may be informed to the user using a manual or the like as a rule of this application. In the event that a predetermined nodding action has been performed, and a predetermined angle $\alpha$ has been detected, that effect may be informed to the user using display or sound (or voice). The predetermined nodding action can be performed by confirming change in the output of the sensor as illustrated in FIG. 33 or 34, for example. Also, in the event that the predetermined angle $\alpha$ is greater than a predetermined angle, the nodding action can be determined to be malfunction. In the event that the predetermined nodding action and predetermined angle $\alpha$ have not been detected even after elapse of a predetermined period of time after starting execution of the application, the user may be instructed to retry the nodding action using display or sound (or voice).

Figure 35:
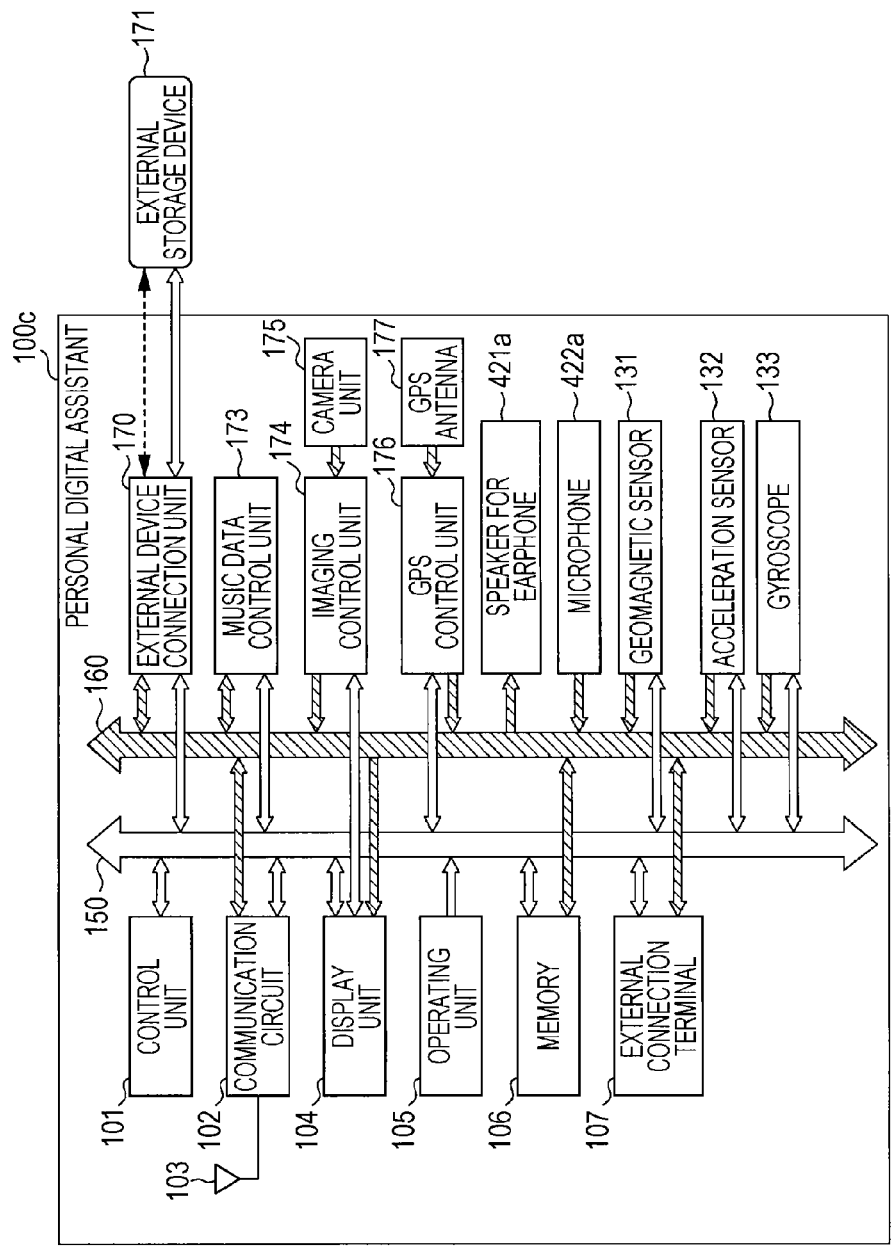
FIG. 35 is a diagram illustrating a configuration example of a personal digital assistant integral with a headphone (earphones) according to further another embodiment of the present disclosure.

With the above description, a case has been assumed wherein the personal digital assistant and the headphone are separated. However, a configuration can also be conceived wherein the functions of the personal digital assistant are housed in the headphone. FIG. 35 illustrates a configuration example of a personal digital assistant 100c integral with such a headphone (earphone). This device can also be taken as a headphone in which the functions of the personal digital assistant are housed.

A speaker 421a and a microphone 422a which are for the earphones are attached to the casing of the personal digital assistant 100c.

In the case of a stereo type headphone, each of the left and right earphones may have the configuration in FIG. 11. In this case, control of the left and right earphones may be performed so that processing common to the left and right is executed on only one of the earphones. Alternatively, one of the left and right earphones may have the configuration in FIG. 35. In this case, the left and right earphones are connected between each other by cable or by radio.

Note that all of the components illustrated as the personal digital assistant 100c are not vital. Also, other components included in an existing personal digital assistant not illustrated in the drawing may be included.

As described above, an embodiment of the present disclosure includes the following various configurations.

(1) An information processing apparatus including circuitry configured to detect a current location of the information processing apparatus; obtain a direction of a destination from the detected current location as a target direction; detect a facial orientation of a user wearing a headphone unit connected to the information processing apparatus via a wired or wireless connection in relation to a reference orientation based on outputs of a geomagnetic sensor and an acceleration sensor connected to the headphone unit; obtain a relative target angle based on a difference between the target direction and the user's facial orientation; and generate sound to be output by the headphone unit based on the obtained relative target angle.

(2) The information processing apparatus of (1), wherein the circuitry is configured to generate sound in a predetermined mode indicating that the user's facial orientation coincides with the target direction when the relative target angle is included in an angle range including 0 degrees.

(3) The information processing apparatus of (1), wherein the circuitry is configured to generate sound in a first mode when the relative target angle is in a first angle range, and generate sound in a second mode, which is different from the first mode, when the relative target angle is outside of the first angle range and included in a second angle range.

(4) The information processing apparatus of (3), wherein the headphone unit includes left and right earphones, and the circuitry is configured to generate the sound by changing a volume of the left or right earphone based on whether the target direction is on the user's right side or left side when the relative target angle is outside of the first angle range and included in the second angle range.

(5) The information processing apparatus of (3), wherein the circuitry is configured to generate sound in a third mode when the relative target angle is included in a third angle range corresponding to a rear side of the user's facial orientation.

(6) The information processing apparatus of (1), wherein the circuitry is further configured to: obtain distance from the current location to the destination; and change the sound output from the headphone unit to another mode based on the obtained distance.

(7) The information processing apparatus of (1), wherein the circuitry is configured to: obtain a horizontal plane based on a gravity vector obtained based on output of the acceleration sensor; obtain the reference orientation by projecting a geomagnetic vector obtained from an output of the geomagnetic sensor on the horizontal plane; determine a direction of a straight line where a side face of the headphone unit which is in contact with the user's ear or a plane parallel to the side face intersects with the horizontal plane to be the facial orientation; and based on an angle $\theta d$ as to the reference orientation of the target direction, and an angle $\theta f$ as to the reference orientation of the facial orientation, obtain a relative target angle $\theta x$ that the target direction makes up as to the user's facial orientation.

(8) The information processing apparatus of (1), wherein the circuitry is configured to: obtain a horizontal plane based on a gravity vector obtained based on an output of the acceleration sensor; obtain the reference orientation by projecting a geomagnetic vector obtained from an output of the geomagnetic sensor on the horizontal plane; project a forward direction of the headphone unit on the horizontal plane as the facial orientation; and based on an angle $\theta d$ as to the reference orientation of the target direction, and an angle $\theta f$ as to the reference orientation of the facial orientation, obtain a relative target angle $\theta x$ that the target direction makes up as to the user's facial orientation.

(9) The information processing apparatus of (7), wherein the circuitry is configured to: control outputting a notification to the user prompting the user to perform an action to nod the user's head in a front direction; and based on an output of the acceleration sensor in a state before nodding and in a state of a maximum nodding angle, obtain an error between the forward direction of the headphone unit and the user's facial orientation; and correct the user's facial orientation based on the error.

(10) The information processing apparatus of (1), wherein the circuitry is configured to obtain the target direction based on a latitude longitude direction of the destination obtained using a map database, and latitude longitude information of the current location.

(11) The information processing apparatus of (1), wherein the circuitry is configured to: obtain a plurality of target directions; obtain a plurality of relative target angles based on the plurality of target directions; and generate different sounds to be output by the headphone unit with regard to each of the plurality of relative target angles.

(12) The information processing apparatus of (11), wherein the circuitry is configured to: obtain additional information relating to a destination existing in the plurality of target directions; and control the headphone unit to play, when a determination is made based on output of the acceleration sensor that the user stops to face one direction of the plurality of target directions, additional information relating to a destination corresponding to the one direction of the plurality of target directions using an audio message.

(13) The information processing apparatus of (12), wherein the circuitry is further configured to select, after starting acoustic navigation regarding the plurality of target directions and narrowing the plurality of target directions to one target direction, the one target direction according to a predetermined condition.

(14) The information processing apparatus of (13), wherein the circuitry is configured to stop subsequent acoustic navigation regarding other of the plurality of target directions when the plurality of target directions has been narrowed to one target direction.

(15) An information processing method performed by an information processing apparatus, the method including: detecting a current location of the information processing apparatus; obtaining a direction of a destination from the detected current location as a target direction; detecting a facial orientation of a user wearing a headphone unit connected to the information processing apparatus via a wired or wireless connection in relation to a reference orientation based on outputs of a geomagnetic sensor and an acceleration sensor connected to the headphone unit; obtaining a relative target angle based on a difference between the target direction and the user's facial orientation; and generating sound to be output by the headphone unit based on the obtained relative target angle.

(16) A non-transitory computer-readable medium including computer program instructions, which when executed by an information processing apparatus, cause the information processing apparatus to: detect a current location of the information processing apparatus; obtain a direction of a destination from the detected current location as a target direction; detect a facial orientation of a user wearing a headphone unit connected to the information processing apparatus via a wired or wireless connection in relation to a reference orientation based on outputs of a geomagnetic sensor and an acceleration sensor connected to the headphone unit; obtain a relative target angle based on a difference between the target direction and the user's facial orientation; and generate sound to be output by the headphone unit based on the obtained relative target angle.

Though preferred embodiments of the present disclosure have been described so far, various modifications and changes may be performed other than mentioned above. Specifically, it is understood as a matter of course that as long as within a range of Claims or equivalent to Claims, various modifications and combinations and other embodiments can be conceived according to design or other factors by one skilled in the art.

For example, in the event that a headphone including left and right earphones include the above-mentioned posture detecting units for both the left and right, an acoustic navigation application such as the present embodiment is arranged to use the posture detecting unit of one of the left and right earphones. Whether to use the left or right may be set as default. Instead of this, the user may also select either of the left and right.

Though description has been made assuming navigation at the time of the user's walking, the present disclosure may also be applied to a situation wherein the user wearing the headphone moves riding in a vehicle such as a car or the like.

With the present embodiment, part of factors (and processing) relating to audio navigation is responsible for the personal digital assistant side, the part or all thereof may be responsible for the headphone (earphone) side.

A computer program to realize the functions described in the above-mentioned embodiments using a computer, and a recording medium in which the program is stored in a computer-readable manner are also included in the present disclosure. Examples of "recording medium" to supply the program include magnetic recording media (flexible disk, hard disk, magnetic tape, etc.), optical discs (magneto-optical disks such as MO, PD and so forth, CD, DVD, etc.), and semiconductor storage.

The invention claimed is:

1. An information processing apparatus comprising:
    circuitry configured to
        detect a current location of the information processing apparatus;
        obtain a direction of a destination from the detected current location as a target direction;
        detect a facial orientation of a user wearing a headphone unit connected to the information processing apparatus via a wired or wireless connection in relation to a reference orientation based on outputs of a geomagnetic sensor and an acceleration sensor connected to the headphone unit;
        obtain a relative target angle based on a difference between the target direction and the user's facial orientation; and
        generate sound to be output by the headphone unit based on the obtained relative target angle.

2. The information processing apparatus of claim 1, wherein
    the circuitry is configured to generate sound in a predetermined mode indicating that the user's facial orientation coincides with the target direction when the relative target angle is included in an angle range including 0 degrees.

3. The information processing apparatus of claim 1, wherein
    the circuitry is configured to generate sound in a first mode when the relative target angle is in a first angle range, and generate sound in a second mode, which is different from the first mode, when the relative target angle is outside of the first angle range and included in a second angle range.

4. The information processing apparatus of claim 3, wherein
    the headphone unit includes left and right earphones, and
    the circuitry is configured to generate the sound by changing a volume of the left or right earphone based on whether the target direction is on the user's right side or left side when the relative target angle is outside of the first angle range and included in the second angle range.

5. The information processing apparatus of claim 3, wherein
    the circuitry is configured to generate sound in a third mode when the relative target angle is included in a third angle range corresponding to a rear side of the user's facial orientation.

6. The information processing apparatus of claim 1, wherein the circuitry is further configured to:
    obtain distance from the current location to the destination; and
    change the sound output from the headphone unit to another mode based on the obtained distance.

7. The information processing apparatus of claim 1, wherein the circuitry is configured to:
    obtain a horizontal plane based on a gravity vector obtained based on output of the acceleration sensor;
    obtain the reference orientation by projecting a geomagnetic vector obtained from an output of the geomagnetic sensor on the horizontal plane;
    determine a direction of a straight line where a side face of the headphone unit which is in contact with the user's ear or a plane parallel to the side face intersects with the horizontal plane to be the facial orientation; and
    based on an angle θd as to the reference orientation of the target direction, and an angle θf as to the reference orientation of the facial orientation, obtain a relative target angle θx that the target direction makes up as to the user's facial orientation.

8. The information processing apparatus of claim 1, wherein the circuitry is configured to:
    obtain a horizontal plane based on a gravity vector obtained based on an output of the acceleration sensor;
    obtain the reference orientation by projecting a geomagnetic vector obtained from an output of the geomagnetic sensor on the horizontal plane;
    project a forward direction of the headphone unit on the horizontal plane as the facial orientation; and
    based on an angle θd as to the reference orientation of the target direction, and an angle θf as to the reference orientation of the facial orientation, obtain a relative target angle θx that the target direction makes up as to the user's facial orientation.

9. The information processing apparatus of claim 7, wherein the circuitry is configured to:
    control outputting a notification to the user prompting the user to perform an action to nod the user's head in a front direction; and
    based on an output of the acceleration sensor in a state before nodding and in a state of a maximum nodding angle, obtain an error between the forward direction of the headphone unit and the user's facial orientation; and
    correct the user's facial orientation based on the error.

10. The information processing apparatus of claim 1, wherein
    the circuitry is configured to obtain the target direction based on a latitude longitude direction of the destination obtained using a map database, and latitude longitude information of the current location.

11. The information processing apparatus of claim 1, wherein the circuitry is configured to:
    obtain a plurality of target directions;
    obtain a plurality of relative target angles based on the plurality of target directions; and generate different sounds to be output by the headphone unit with regard to each of the plurality of relative target angles.

12. The information processing apparatus of claim 11, wherein the circuitry is configured to:
   obtain additional information relating to a destination existing in the plurality of target directions; and
   control the headphone unit to play, when a determination is made based on output of the acceleration sensor that the user stops to face one direction of the plurality of target directions, additional information relating to a destination corresponding to the one direction of the plurality of target directions using an audio message.

13. The information processing apparatus of claim 12, wherein the circuitry is further configured to select, after starting acoustic navigation regarding the plurality of target directions and narrowing the plurality of target directions to one target direction, the one target direction according to a predetermined condition.

14. The information processing apparatus of claim 13, wherein the circuitry is configured to stop subsequent acoustic navigation regarding other of the plurality of target directions when the plurality of target directions has been narrowed to one target direction.

15. An information processing method performed by an information processing apparatus, the method comprising:
   detecting a current location of the information processing apparatus;
   obtaining a direction of a destination from the detected current location as a target direction;
   detecting a facial orientation of a user wearing a headphone unit connected to the information processing apparatus via a wired or wireless connection in relation to a reference orientation based on outputs of a geomagnetic sensor and an acceleration sensor connected to the headphone unit;
   obtaining a relative target angle based on a difference between the target direction and the user's facial orientation; and
   generating sound to be output by the headphone unit based on the obtained relative target angle.

16. A non-transitory computer-readable medium including computer program instructions, which when executed by an information processing apparatus, cause the information processing apparatus to:
   detect a current location of the information processing apparatus;
   obtain a direction of a destination from the detected current location as a target direction;
   detect a facial orientation of a user wearing a headphone unit connected to the information processing apparatus via a wired or wireless connection in relation to a reference orientation based on outputs of a geomagnetic sensor and an acceleration sensor connected to the headphone unit;
   obtain a relative target angle based on a difference between the target direction and the user's facial orientation; and
   generate sound to be output by the headphone unit based on the obtained relative target angle.

* * * * *